United States Patent
Fukushima et al.

(10) Patent No.: US 9,237,335 B2
(45) Date of Patent: Jan. 12, 2016

(54) THREE-DIMENSIONAL IMAGE DISPLAY APPARATUS

(75) Inventors: Rieko Fukushima, Tokyo (JP); Yuzo Hirayama, Yokohama (JP); Norihiro Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 994 days.

(21) Appl. No.: 13/404,637

(22) Filed: Feb. 24, 2012

(65) Prior Publication Data
US 2012/0249530 A1  Oct. 4, 2012

Related U.S. Application Data

(63) Continuation of application No. PCT/JP2011/057732, filed on Mar. 29, 2011.

(51) Int. Cl.
*H04N 13/04* (2006.01)
*G02B 27/22* (2006.01)

(52) U.S. Cl.
CPC ........ *H04N 13/0404* (2013.01); *G02B 27/2214* (2013.01); *H04N 13/0475* (2013.01); *H04N 13/0477* (2013.01); *H04N 13/0415* (2013.01)

(58) Field of Classification Search
CPC ........... G02B 27/2214; H04N 13/0404; H04N 13/0415; H04N 13/0475; H04N 13/0477
See application file for complete search history.

(56) References Cited

U.S. PATENT DOCUMENTS

| | | | |
|---|---|---|---|
| 6,064,424 A | 5/2000 | Van Berkel et al. | |
| 6,377,295 B1 | 4/2002 | Woodgate et al. | |
| 7,425,951 B2 | 9/2008 | Fukushima et al. | |
| 8,681,075 B2 * | 3/2014 | Uehara | 345/32 |
| 8,823,888 B2 * | 9/2014 | Tsai et al. | 349/15 |
| 8,823,890 B2 * | 9/2014 | Sekine | 349/15 |
| 2003/0214459 A1 | 11/2003 | Nishihara et al. | |
| 2006/0215018 A1 | 9/2006 | Fukushima et al. | |
| 2008/0225113 A1 | 9/2008 | Saishu et al. | |
| 2009/0278936 A1 | 11/2009 | Pastoor et al. | |
| 2010/0118045 A1 | 5/2010 | Brown Elliott et al. | |

FOREIGN PATENT DOCUMENTS

| | | |
|---|---|---|
| CN | 1703099 A | 11/2005 |
| CN | 101006733 A | 7/2007 |

(Continued)

OTHER PUBLICATIONS

Office Action mailed by Taiwanese Intellectual Property Office on Jan. 21, 2014, for corresponding Taiwanese Patent Application No. 100133422, and English translation.

Notification of the First Office Action mailed Feb. 20, 2014, for Chinese Patent Application No. 201180002445.8, with English translation (26 pages).

(Continued)

*Primary Examiner* — Nhon Diep
(74) *Attorney, Agent, or Firm* — Finnegan, Henderson, Farabow, Garrett & Dunner, LLP

(57) ABSTRACT

In an image display apparatus, the sub-pixel areas which are correspondingly assigned to the optical apertures are defined according to an observation position of a viewer, and the sub-pixel areas includes sub-pixel segments into which the sub-pixel positioned at a boundary between adjacent sub-pixel areas is separated. The sub-pixel segments correspond to the adjacent sub-pixel areas and are observed via adjacent optical openings. The sub-pixel display information obtained by mixing parallax information belonging to the adjacent sub-pixel areas is displayed in the sub-pixel including the adjacent sub-pixel segment.

14 Claims, 30 Drawing Sheets

(56) References Cited

FOREIGN PATENT DOCUMENTS

| | | |
|---|---|---|
| CN | 101233766 A | 7/2008 |
| CN | 101512414 A | 8/2009 |
| DE | 102004059729 B3 | 4/2006 |
| EP | 1045596 A2 | 10/2000 |
| JP | 11085095 A | 3/1999 |
| JP | 2004 271617 A | 9/2004 |
| JP | 2006 091642 A | 4/2006 |
| JP | 2006-174258 | 6/2006 |
| JP | 2006 309178 A | 11/2006 |
| JP | 3892808 | 12/2006 |
| JP | 2007-298995 A | 11/2007 |
| JP | 2008-83600 | 4/2008 |
| JP | 2009 239665 A | 10/2009 |
| JP | 2010-503009 | 1/2010 |
| JP | 2010 222490 A | 10/2010 |
| JP | 2012-080261 | 4/2012 |
| TW | 201001331 A1 | 1/2010 |
| WO | WO/2007/026444 A1 | 3/2007 |
| WO | WO 2008/026136 A1 | 3/2008 |

OTHER PUBLICATIONS

English Language International Search Report mailed May 17, 2011, for International Application No. PCT/JP2011/057732 (3 pages).

Extended European Search Report, for European Patent Application 11813860.1, dated Jun. 11, 2014 (8 pages).

Hong, et al., "Autosteroscopic multi-view 3D display with pivot function, using the image display of the square subpixel structure," Displays. 29:512-520 (2008) (9 pages).

Mashitani, et al., "Step barrier system multi-view glass-less 3-D display," SPIE, 5291:265-272 (2004) (8 pages).

Translation of International Preliminary Report on Patentability and Written Opinion of the International Searching Authority, for International Application No. PCT/JP2011/057732, dated Oct. 10, 2013 (5 pages).

Norihiro Nakamura et al., "Three-Dimensional Image Display Apparatus and Image Processing Apparatus", U.S. Appl. No. 13/044,086, filed Mar. 9, 2011.

Office Action in corresponding Japanese Patent Application 2011-546367, mailed Feb. 12, 2013, including English translation.

\* cited by examiner

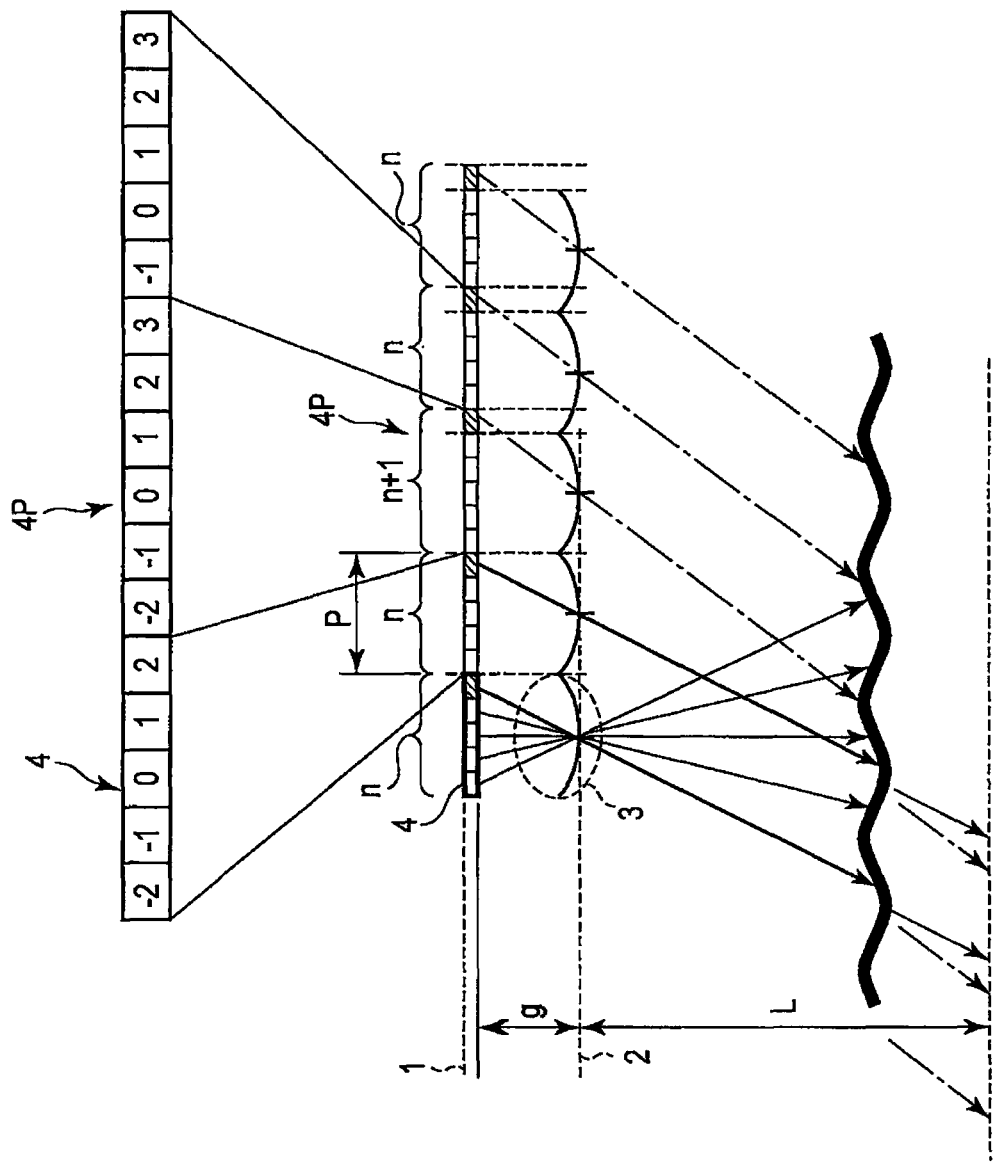
F I G. 6

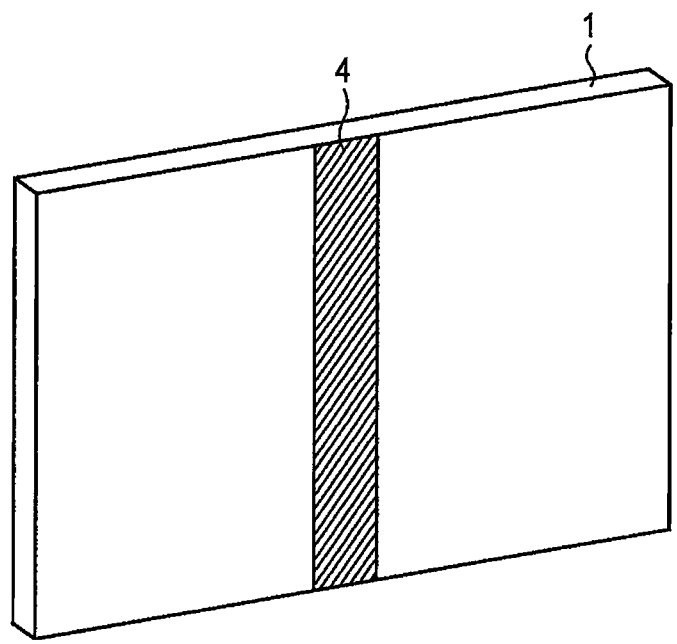
F I G. 12C

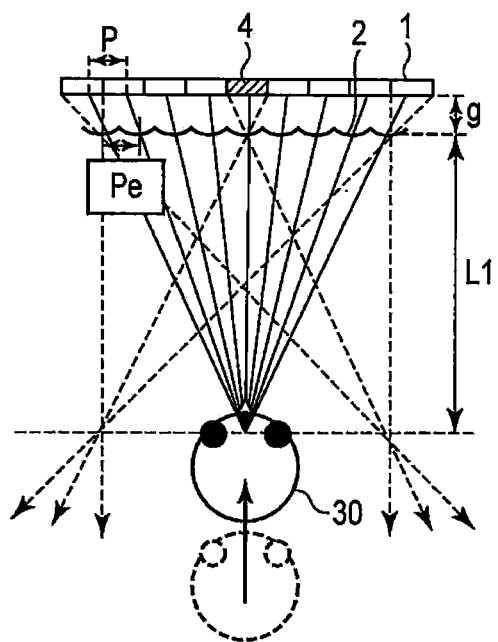
F I G. 13A
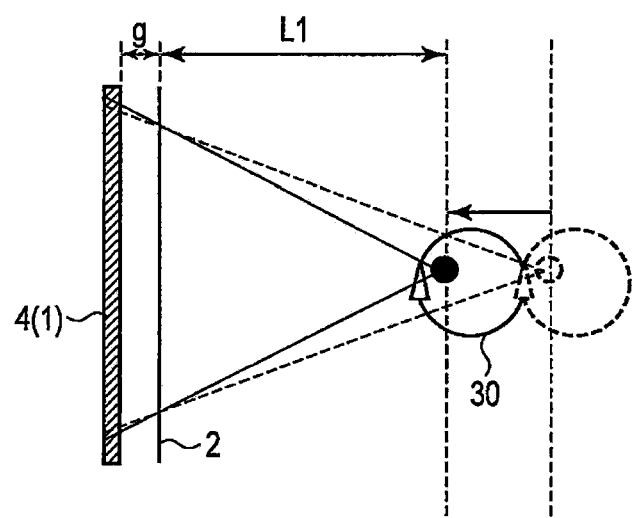
F I G. 13B

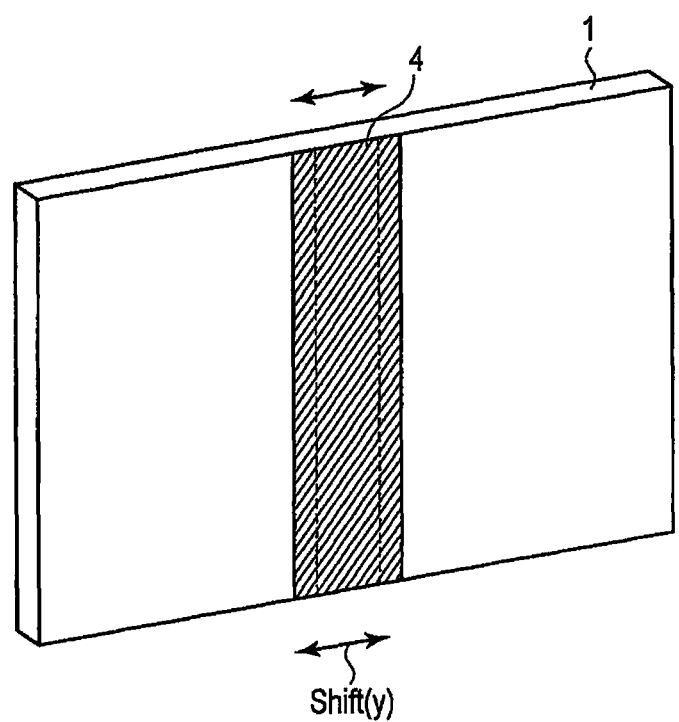
F I G. 13C

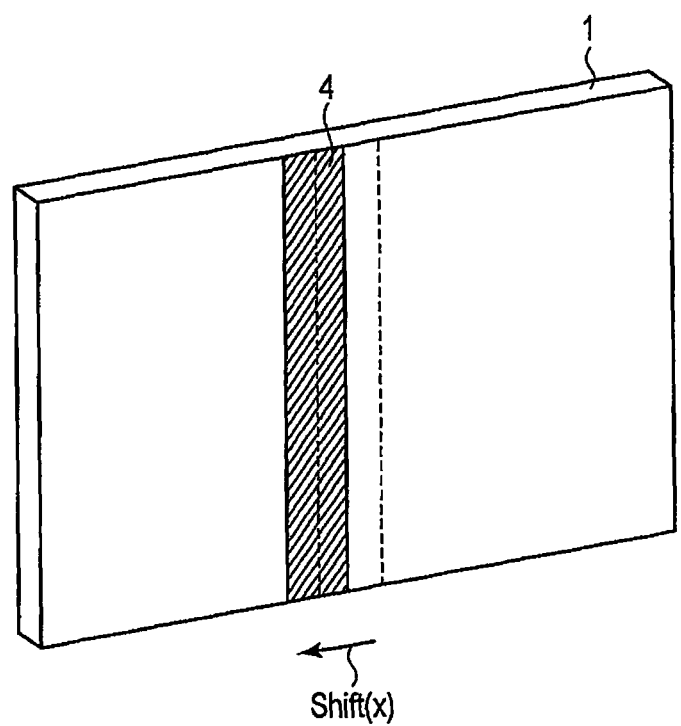
F I G. 14C

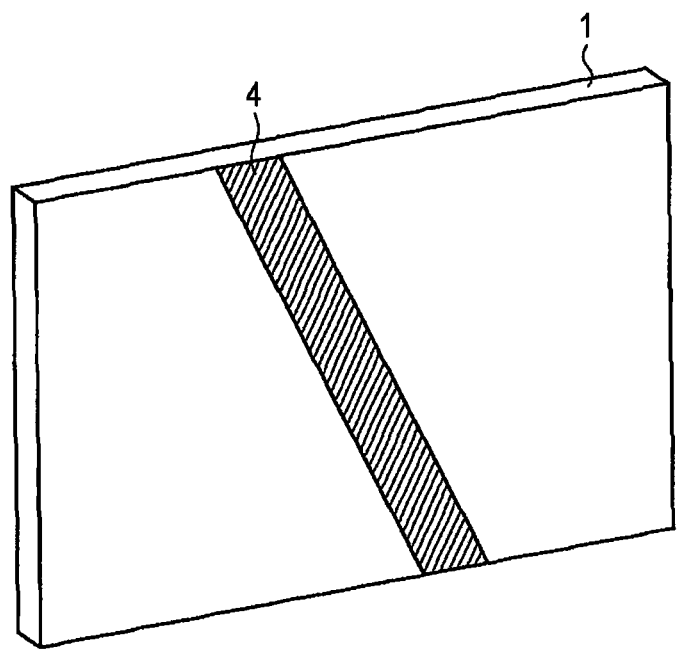
F I G. 16C

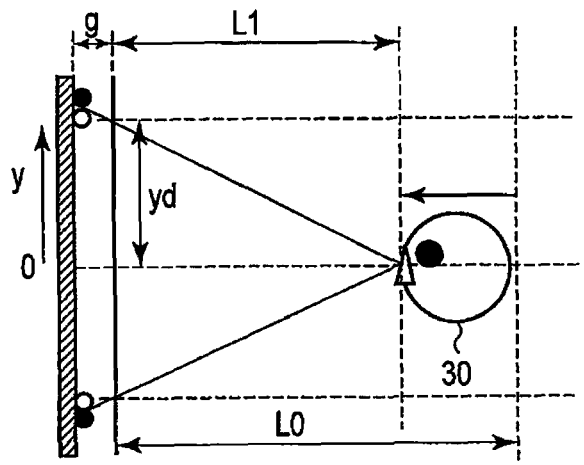
F I G. 18A
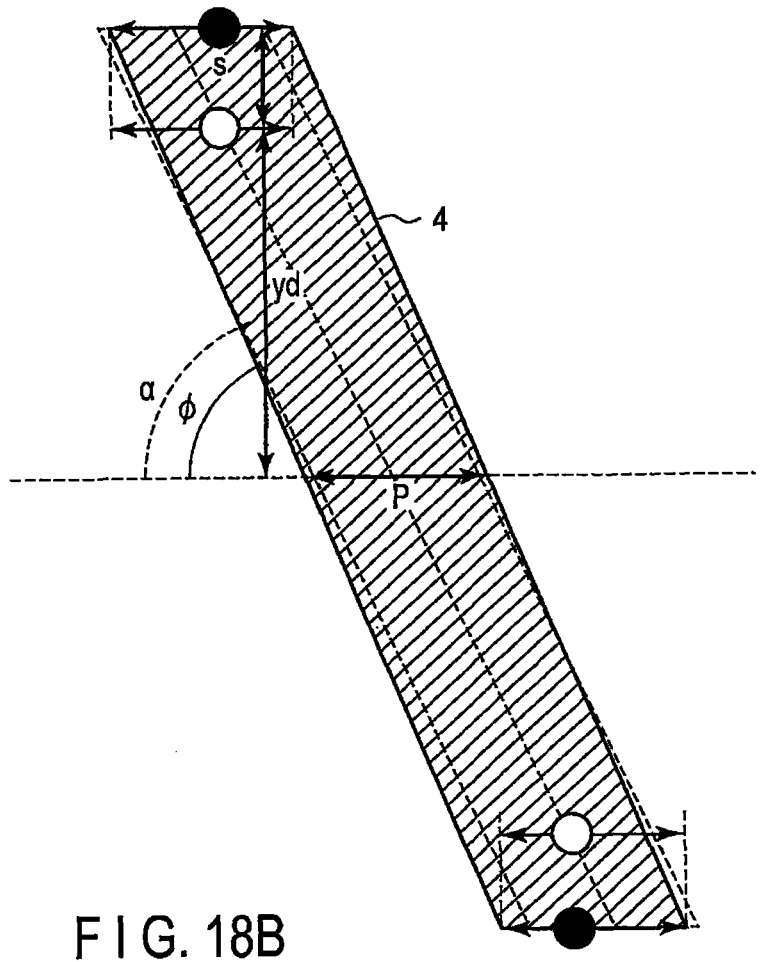
F I G. 18B

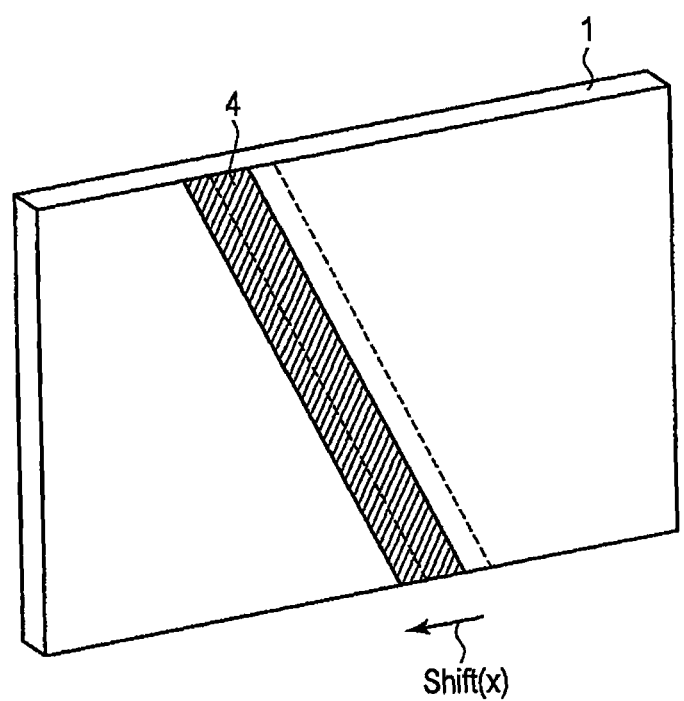
F I G. 19C

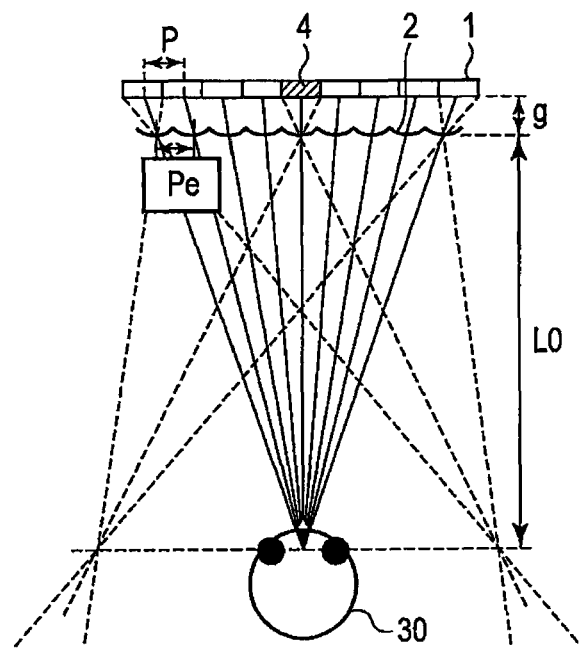
F I G. 20A
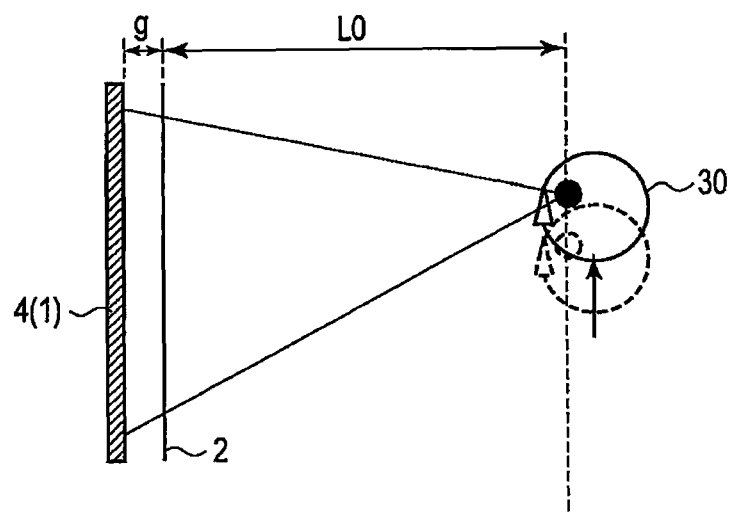
F I G. 20B

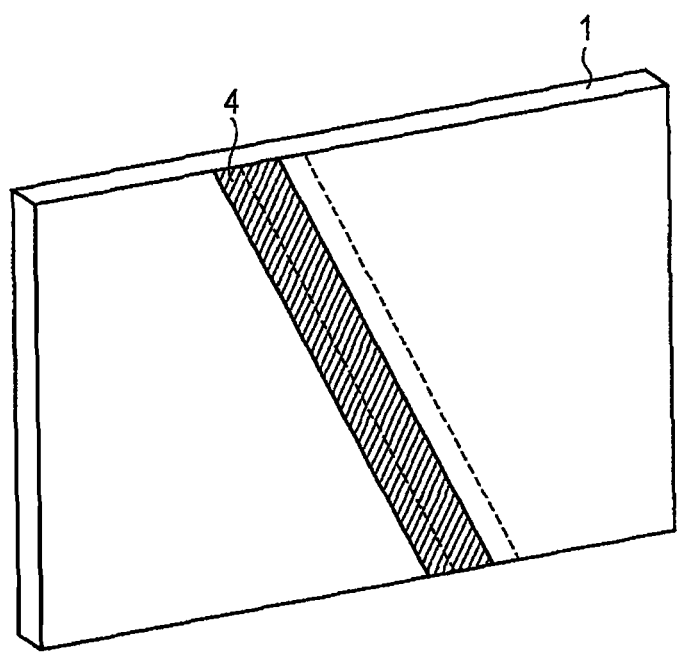
F I G. 20C

THREE-DIMENSIONAL IMAGE DISPLAY APPARATUS

CROSS REFERENCE TO RELATED APPLICATIONS

This application is a Continuation Application of PCT Application No. PCT/JP2011/057732, filed Mar. 29, 2011, the entire contents of which are incorporated herein by reference.

FIELD

Embodiments relate to a three-dimensional image display apparatus.

BACKGROUND

There are known various types of three-dimensional image display apparatuses capable of displaying moving picture image, that is, three-dimensional displays. In recent years, a three-dimensional display, particularly of a flat panel type, has been desired to be developed which requires no dedicated glasses or the like. Some three-dimensional image display apparatuses of a type requiring no dedicated glasses are configured such that a light ray control element is installed immediately before a display panel (display apparatus) with fixed pixel positions, such as a direct-view liquid crystal display apparatus, a projection liquid crystal display apparatus or plasma display apparatus, so as to controllably direct the emission of light rays from the display panel toward an observer.

The light ray control element according to this scheme has a function to control light rays so that even when looking at the same position on the light ray control element, the observer views different picture images depending on the angle at which the observer looks at the light ray control element. Specifically, an array of slits (parallax barrier) or an array of lenticular lenses (lenticular sheet) is used as a light ray control element to apply only lateral parallaxes (what is called horizontal parallaxes). A pin hole array or a lens array is used as a light ray control element to apply not only horizontal parallaxes but also up-down parallaxes (vertical parallaxes).

The apparatuses for three-dimensional displays using a light ray control element are further classified into a binocular type, a multi-view type, a super multi-view type (super multi-view conditions for the multi-view type), an integral imaging type (hereinafter sometimes simply referred to as the II type), and the like. In the binocular type, at a preset observation position (viewpoint position), both eyes are subjected to binocular parallaxes for stereoscopic viewing. In the multi-view type, the super-multi-view type, or the like (hereinafter simply referred to as the multi-view type), a plurality of viewpoint positions are used to increase a visible range and to make side surfaces visible (to provide motion parallaxes). The II type display apparatus, invented about 100 years ago, is based on the principle of integral photography (IP) applied to three-dimensional photographs. A three-dimensional image display apparatus of the II type is known from Japanese Patent No. 3892808. Three-dimensional picture images (picture images) observed using the multi-view or II type more or less involve motion parallaxes and are referred to as three-dimensional picture images distinctively from binocular type stereoscopic picture images.

A three-dimensional image display apparatus with a combination of a light ray control element and a flat display device generally adopts a technique to design the apparatus with an assumed viewpoint position. However, the technique to design the apparatus with the assumed viewpoint position disadvantageously limits the viewpoint position. Furthermore, a technique to design the apparatus with no assumed viewpoint position disadvantageously slightly narrows a viewing space. Thus, there has been a desire to improve display images so as to eliminate the restraint on the viewpoint position and to maximize the viewing space.

BRIEF DESCRIPTION OF THE DRAWINGS

FIG. 6 is a schematic diagram of the three-dimensional image display apparatus shown in FIG. 2, illustrating a third comparative example of the II type for description of observation of a three-dimensional image;

FIG. 12C is a schematic diagram showing a display panel in that case where the observer is positioned as shown in FIG. 12A and FIG. 12B and a certain sub-pixel area displayed on the display panel;

FIG. 13A is a schematic diagram showing the sub-pixel areas in the horizontal plane in the three-dimensional image display apparatus according to the embodiment in which the observer is positioned away from the position of a visual distance in FIG. 12;

FIG. 13B is a schematic diagram showing the sub-pixel area in the vertical plane in the three-dimensional image display apparatus according to the embodiment in which the observer is positioned away from the position of the visual distance in FIG. 12;

FIG. 13C is a schematic diagram showing the display panel in the case where the observer is positioned as shown in FIG. 13A and FIG. 13B and the certain sub-pixel area shown extended on the display panel;

FIG. 14C is a schematic diagram showing the certain sub-pixel area shown shifted on the display panel when the observer is shifted on the reference plane as shown in FIG. 14A and FIG. 14B;

FIG. 16C is a schematic diagram showing the display panel in that case where the observer is positioned as shown in FIG. 16A and FIG. 16B and a certain sub-pixel area obliquely displayed on the display panel;

FIG. 18A is a schematic diagram showing the sub-pixel areas in the horizontal plane in the three-dimensional image display apparatus shown in FIG. 15 and in which the observer is positioned closer to the display panel than the reference plane defined at the position of the visual distance in FIG. 16;

FIG. 18B is a schematic diagram showing the certain sub-pixel area on the display panel with a display area of the sub-pixel area changed when the observer is positioned as shown in FIG. 18A;

FIG. 19C is a schematic diagram showing the certain sub-pixel area shown shifted on the display panel when the observer is shifted on the reference plane as shown in FIG. 19A and FIG. 19B;

FIG. 20A is a schematic diagram showing the sub-pixel areas in the horizontal plane in the three-dimensional image display apparatus shown in FIG. 15 and in which the observer is shifted on the reference plane defined at the position of the visual distance in FIG. 16;

FIG. 20B is a schematic diagram showing the sub-pixel areas in the vertical plane in the three-dimensional image display apparatus shown in FIG. 15 and in which the observer is shifted on the reference plane defined at the position of the visual distance in FIG. 16;

FIG. 20C is a schematic diagram showing the certain sub-pixel area shown shifted on the display panel when the observer is shifted on the reference plane as shown in FIG. 20A and FIG. 20B;

DETAILED DESCRIPTION

Three-dimensional image display apparatuses according to embodiments will be described with reference to the drawings.

According to an embodiment, there is provided a method of displaying a three-dimensional image on a display apparatus. The display apparatus comprises a display part having sub-pixels arranged in a matrix along a first direction and a second direction orthogonal to the first direction; and a light ray control element which comprises a plurality of optical apertures. Parallax image information observed via the optical apertures is displayed in sub-pixel areas to allow a three-dimensional image to be observed at an observation position. The method comprises defining sub-pixel areas to which the optical apertures are assigned according to the observation position, respectively, specifying adjacent sub-pixel segments into which predetermined one of the sub-pixels is separated, wherein the predetermined sub-pixel corresponds to one of adjacent sub-pixels positioned at a boundary between adjacent sub-pixel areas; and displaying, on the predetermined sub-pixel, sub-pixel display information obtained by mixing parallax information belonging to the adjacent sub-pixel areas, wherein the predetermined sub-pixel is observed via the adjacent optical apertures.

Figure 1:
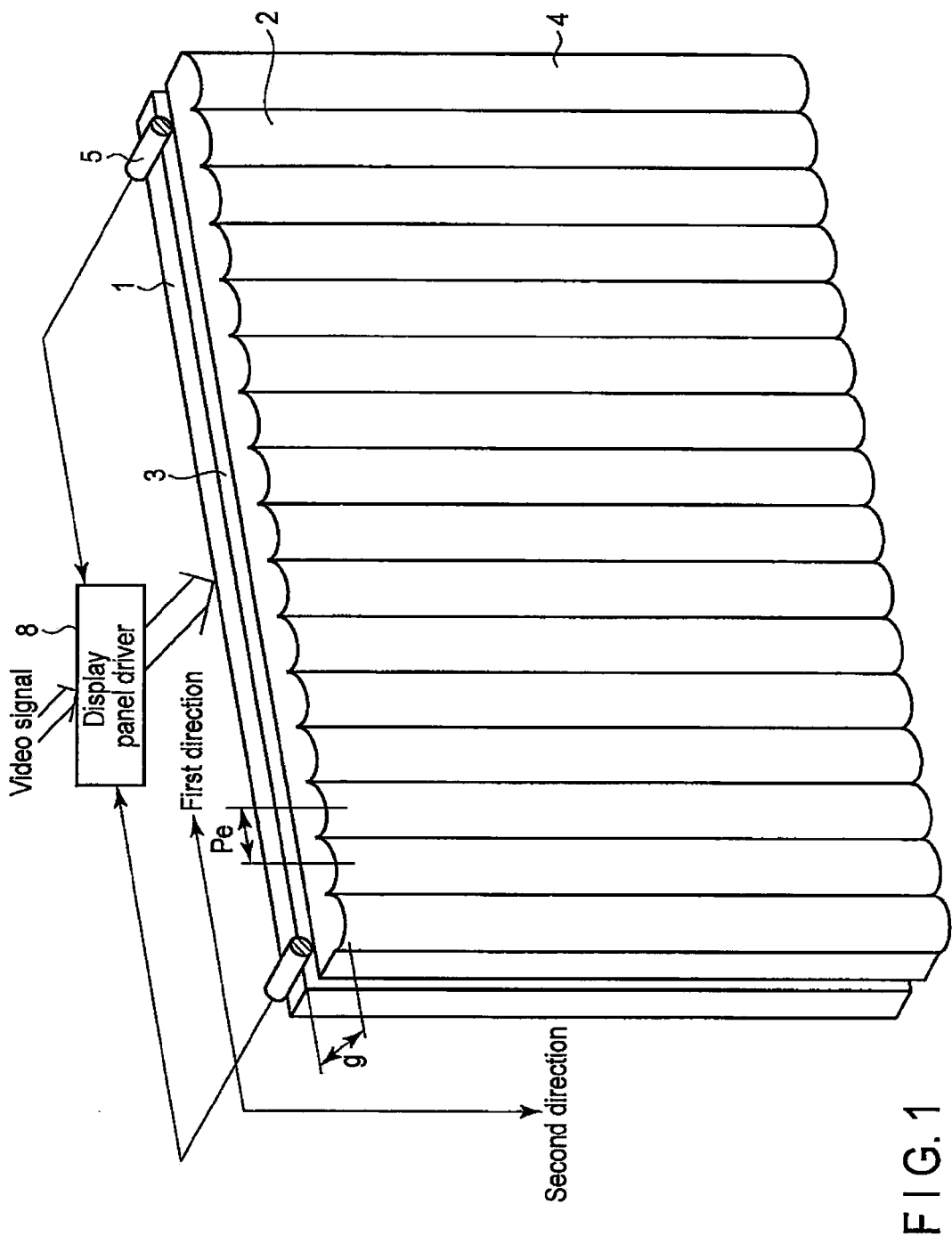
FIG. 1 is a perspective view schematically showing the structure of a three-dimensional image display apparatus enabling three-dimensional images to be observed in an autostereoscopic manner (glasses-free type) according to an embodiment.
Figure 2:
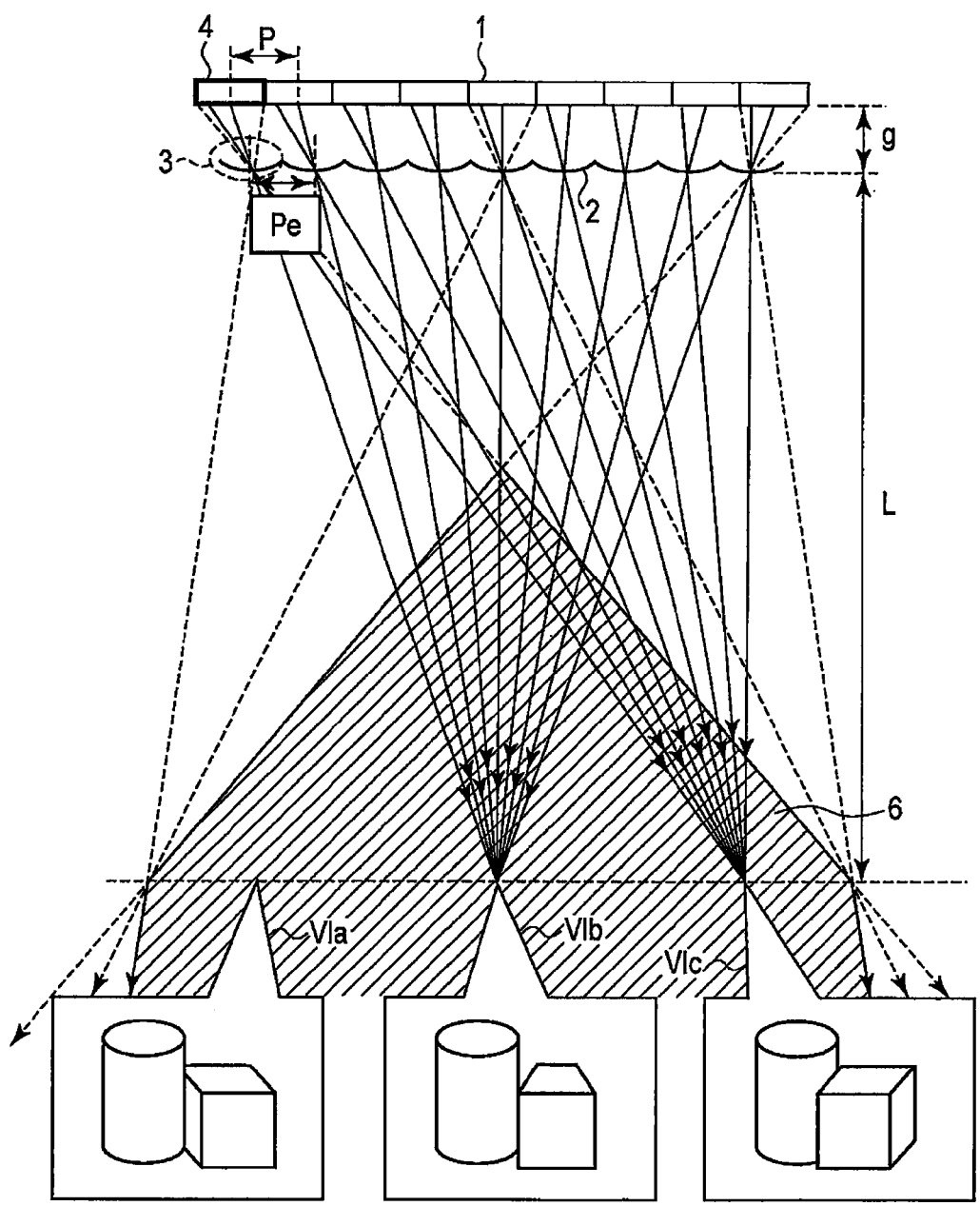
FIG. 2 is a schematic diagram schematically showing trajectories of light rays which enable three-dimensional images to be observed in a common three-dimensional image display apparatus.

FIG. 1 schematically shows the structure of a three-dimensional image display apparatus enabling three-dimensional images to be observed in a common auto-stereoscopic manner (glasses-free type); the three-dimensional image display apparatus is of a multi-view type or a II type. The three-dimensional image display apparatus comprises a display panel (two-dimensional image display apparatus) 1 with fixed pixel positions, such as a direct-view or projection liquid crystal display apparatus or plasma display apparatus, and a light ray control element 2 installed in a gap g formed immediately before the display panel 1. The three-dimensional image display apparatus is configured to be of a generally flat panel type. In the three-dimensional image display apparatus of the flat panel type, the display panel 1 emits light rays, and the emission of the light rays is controllably directed toward an observer by the light ray control element. As is well known, in the display panel 1, sub-pixels (RGB sub-pixels) are arranged in a matrix. The light ray control element 2 includes sub-pixel areas 4 located behind optical apertures 3 and each formed of a plurality of sub-pixels, for example, as shown in FIG. 2, so that even when looking at the same position on the light ray control element 2, the observer views different images or picture image pictures depending on a viewing angle. Thus, the observer views, via the optical apertures 3, different sub-pixels depending on an observation position as shown by reference numerals V1$a$, V1$b$, and V1$c$. When viewing, via the light ray control element 2, different display images depending on the observation position, the observer can observe three-dimensional images in front of or behind the display apparatus. In addition, when the same image is displayed on the sub-pixels of the sub-pixel areas 4, the display image remains unchanged even with a change in observation position. This allows two-dimensional images to be observed.

Viewing spaces in such a three-dimensional image display apparatus are defined as the range within which the display image corresponding to the observation position can be viewed for all the optical apertures, that is, the range 6 within which the viewing spaces overlap in which the sub-pixel areas 4 are observed via the optical apertures 3. Namely, determining the sub-pixel areas 4 determines the viewing space in the three-dimensional image display apparatus.

The three-dimensional image display apparatus shown in FIG. 1 is based on a scheme in which only lateral parallaxes (what is called horizontal parallaxes) is applied to allow three-dimensional images to be observed. Thus, a lenticular sheet is used as the light ray control element 2. As is well known, the lenticular sheet is formed of an array of lenticular lenses. Each of the lenticular lenses may be referred to as the optical aperture section 3 because, in a physical optical sense, the lens controllably permits light rays to pass through. Each of the plurality of lenticular lenses 3 (optical apertures) is linearly extended substantially in a second direction, more specifically, in a generally vertical direction (which corresponds to short sides of the flat panel in FIG. 1). The plurality of lenticular lenses (optical apertures 3) are arranged in an array along a first direction (which corresponds to long sides of the flat panel in FIG. 1) orthogonal to the second direction, more specifically, along a horizontal direction.

Here, in the scheme in which only lateral parallaxes (what is called horizontal parallaxes) is applied, a slit array may be adopted, instead of the lenticular sheet, as a parallax barrier which also serves as the optical apertures 3. In the slit array (parallax barrier), slits serving as the optical apertures 3 are linearly extended in the second direction, more specifically, in a generally vertical direction. The plurality of slits are arranged in an array along the first direction, more specifically, along the horizontal direction.

Furthermore, in a three-dimensional image display apparatus that applies not only lateral parallaxes (what is called horizontal parallaxes) but also up-down parallaxes (vertical parallaxes) to enable stereoscopic viewing depending on the direction even in the up-down direction, a pin hole array or a lens array is used as the light ray control element; the pin hole array comprises a plurality of pin holes (optical apertures 3) arranged therein in a matrix, and the lens array comprises a plurality of lens segments (optical apertures 3) arranged therein in a matrix. The application of vertical parallaxes via the pin hole array or the lens array is similar to the application of horizontal parallaxes. Hence, in the description below, the description of horizontal parallaxes also applies to the description of vertical parallaxes, which is thus omitted.

Figure 3:
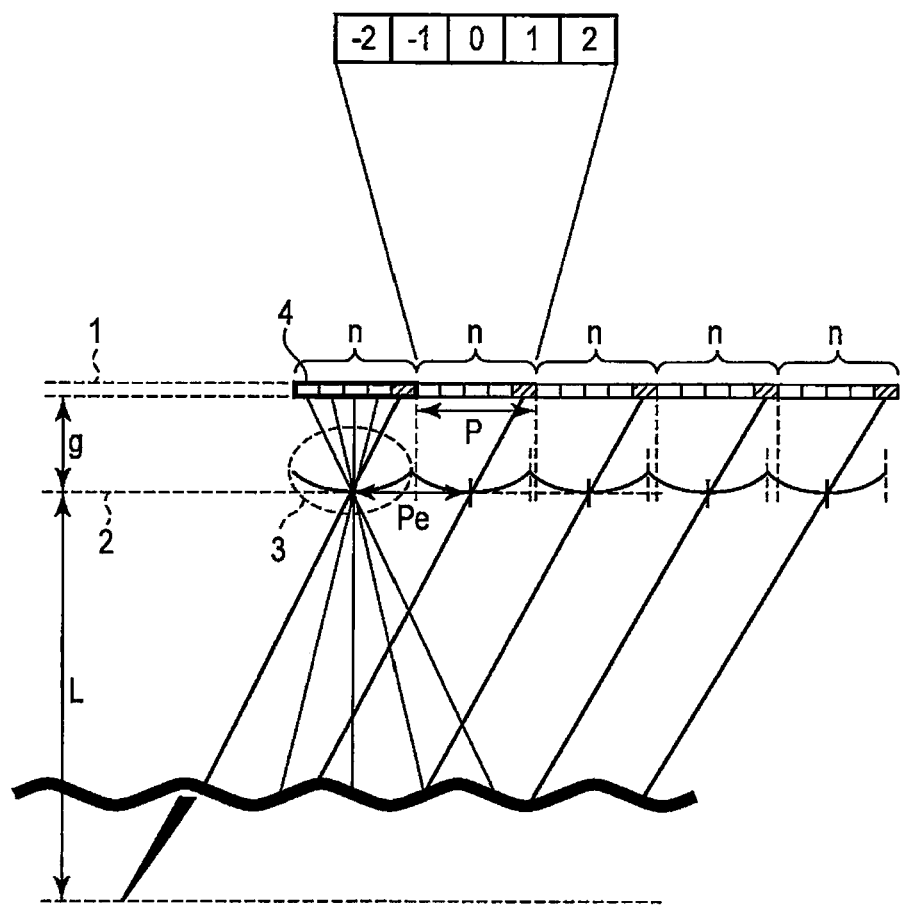
FIG. 3 is a schematic diagram of the three-dimensional image display apparatus shown in FIG. 2, illustrating a first comparative example of multi-view type for description of observation of a three-dimensional image.

The three-dimensional image display apparatus shown in FIG. 1 and FIG. 2 can display three-dimensional images based on the II scheme or the multi-view scheme. However, it should be noted that the multi-view scheme described with reference to FIG. 3 is different from the II scheme described with reference to FIG. 4 to FIG. 7 in design technique and image display technique.

In the description below, the multi-view scheme does not simply mean the multi-view scheme but includes a super multi-view scheme (the multi-view scheme including super multi-view conditions) in addition to the multi-view scheme except for a binocular scheme. Furthermore, in a three-dimensional image display apparatus and a method for displaying three-dimensional picture images according to the present embodiment described with reference to FIG. 8 to FIG. 24, multi-viewpoint images are taken at a plurality of viewpoint positions specified by parallax numbers and converted into pixel information (element images) for three-dimensional picture images. The pixel information is provided to sub-pixel areas in the display panel 1 for display. Thus, in connection with the display of multi-viewpoint images, the apparatus and the method are applicable without the need for a definite distinction between picture images based on the multi-view scheme and picture images based on the II scheme. Therefore, it should be noted that the embodiment described with reference to FIG. 8 to FIG. 24 is described without any distinction between picture images based on the multi-view scheme and picture images based on the II scheme.

The three-dimensional image display apparatus shown in FIG. 1 preferably comprises a position sensor 5 configured to detect the position of the observer (not shown in the drawings) in front of the display panel 1 to acquire an observation position. A sensor signal from the position sensor 5 is provided to a display panel driver 8, which converts the sensor signal into observer coordinates that are an x coordinate, a y coordinate, and a z coordinate specifying the position of the observer. Then, the display panel driver 8 determines the sub-pixel display area 4 depending on the position of the observer, and based on the position, generates pixel information to be provided to the sub-pixels. The display panel driver 8 then supplies the pixel information to a pixel area of the display area 1 to provide the observer with an optimum viewing space for observation of three-dimensional picture images. The reference for the position (x, y, z) of the observer is assumed to be (0, 0, L). Then, not only if the observer shifts the viewpoint in a plane (z=L) based on an observation distance L (x≠0 or y≠0) but also if z moves forward (z<L) or backward (z>L) from the position of L or the viewpoint is shifted (x≠0 and y≠0) in a plane located at a position to which the observer has moved, the sub-pixel areas 4 can be determined depending on the position of the observer, and the optical viewing space for observation of three-dimensional images can be provided to the flat panel 1 as in the case where the observer observes three-dimensional images at z=L.

The display driver 8 sets the sub-pixel areas 4 in the display panel 1 so that the position of the observer, which is specified by the position sensor 5, corresponds to the optimum observation position. More specifically, the sub-pixels in the sub-pixel areas are provided with parallax information specified by parallax numbers to allow the optimum image to be displayed on the display panel 1. A sub-pixel belonging to the boundary between sub-pixel areas is provided with a mixture of two pieces of parallax information to be provided to the sub-pixels in adjacent sub-pixel areas as described below. Here, the mixture ratio is set depending on the areas or widths of two segments into which the sub-pixel belonging to the boundary is separated so that the segments belongs to the respective adjacent sub-pixel areas. Here, if the sub-pixel belonging to the boundary between the sub-pixel areas belongs only to one of the sub-pixel areas, the mixture rate of one piece of the parallax information provided to the sub-pixels in the other sub-pixel area is zero.

It should be noted that the above-described segments of the sub-pixel are not defined as clearly separated areas but are conceptual areas defined simply based on the widths or sizes of the sub-pixel areas. Furthermore, the position sensor 5 is not an essential component of the embodiment, and instead of the position sensor 5, a fixed position (the optimum distance from the display panel 1 or observer information) may be externally input, as positional information, via an input device, for example, a remote controller (not shown in the drawings) for the three-dimensional image display apparatus. In accordance with the input positional information, the sub-pixels in the sub-pixel areas may be provided with parallax information specified by parallax numbers to allow the optimum image to be displayed on the display panel 1.

Figure 9:
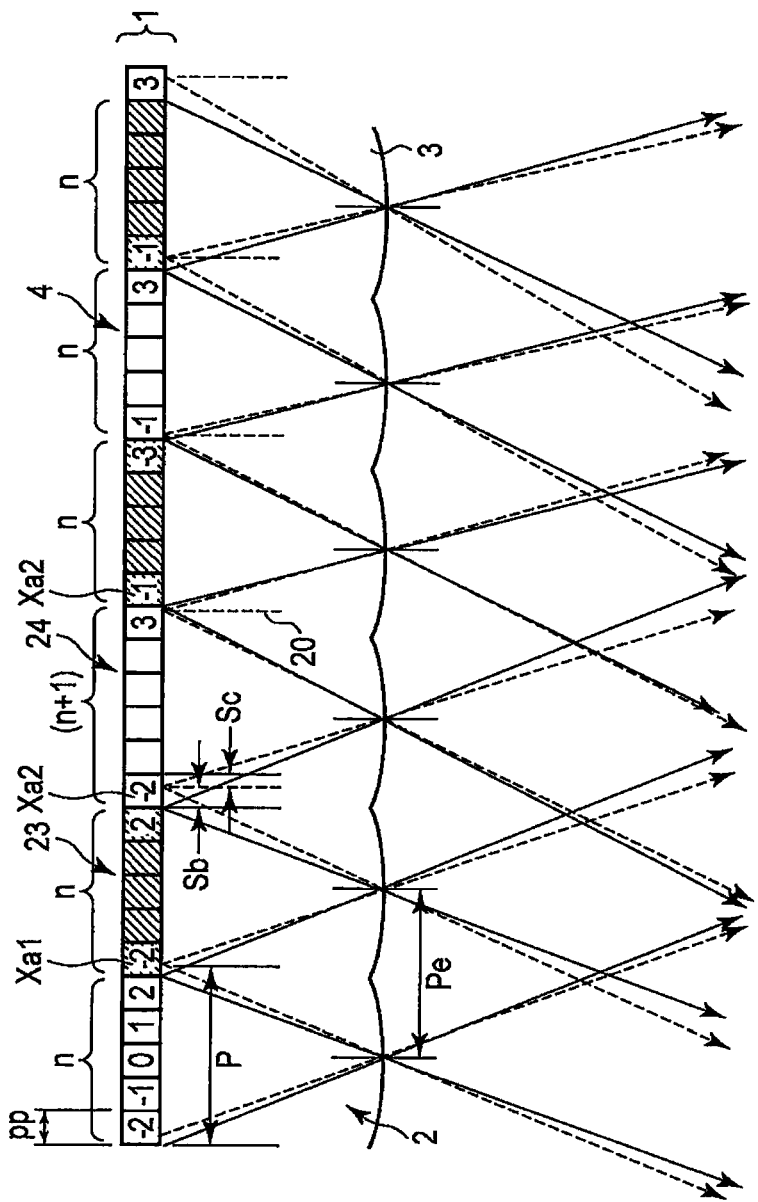
FIG. 9 is a schematic diagram illustrating allocation of sub-pixels according to the third comparative example.

In FIG. 2, examples of trajectories of light rays in a horizontal plane in the common three-dimensional image display apparatus are shown by solid lines. viewing spaces for the optical apertures 3 arranged at the center and at the opposite ends of the array are shown by dashed lines. Only the examples are shown because the diagram is based on the assumption that physical pixels are present at the corresponding positions. In the present application, since the sub-pixel areas 4 are set depending on the observation position, a sub-pixel may be or may not be present at the corresponding position in the sub-pixel area 3. In the three-dimensional image display apparatus shown in FIG. 2, the optical apertures 3 are arranged at a certain aperture pitch Pe, and the sub-pixel areas 4 are so-arranged in a horizontal plane as to have a relationship with the apertures 3. The display panel 1 is formed of a plurality of sub-pixels (for examples, in R, G, and B) arranged at a pixel pitch specified for the display panel 1. The display panel is separated into the sub-pixel areas 4 in association with the optical apertures 3. Here, a certain sub-pixel area 4 assigned to a certain optical aperture section 3 is formed of a certain range of adjacent sub-pixels (in a first comparative example 1 and a second comparative example 2, each sub-pixel area is formed of an integral number n of, for example, five sub-pixels) in association with the adjacently located optical aperture section 3. In a third comparative example 3 described with reference to FIG. 6 and FIG. 7, singular sub-pixel areas 4P each formed of (n+1) sub-pixels are interposed, with a certain period or regularity, among a plurality of sub-pixel areas 4 each formed of an integral number n of sub-pixels appearing at an area pitch P corresponding to the aperture pitch Pe as shown in FIG. 3, so as to disrupt the area pitch P. As described below in comparison with a comparative example, in the present embodiment, a sub-pixel located at the boundary between the sub-pixel areas 4 is separated into one part (one segment) and the remaining part (remaining segment), as shown in FIG. 9, so as to extend the viewing space as in the case of the interposition, with a certain period or regularity, of the singular sub-pixel area 4P formed substantially of (n+1) sub-pixels. Furthermore, the one part (one segment) of the sub-pixel is allocated so as to belong to one of the sub-pixel areas 4, whereas the remaining part (remaining segment) is allocated so as to belong to the other sub-pixel area 4. Thus, as shown in FIG. 9, in this embodiment, the sub-pixel areas 4 are arranged at a constant sub-pixel area pitch P corresponding to the aperture pitch Pe (fixed pitch) of the optical apertures 3. As described with reference to FIG. 12A to FIG. 14C, when the observer is moved (shifted) in a plane substantially parallel to the flat panel 1, the sub-pixel areas 4 are shifted relative to the optical apertures 3. Additionally, when the operator is moved (shifted) closer to the flat panel 1 or away from the flat panel 1, the pitch P of the sub-pixel areas 4 varies in width. The ratio of the width of the one part (one segment) of the sub-pixel to the width of the remaining part (remaining segment) is set to, for example, a quarter of the sub-pixel. In addition, when the basic number of sub-pixels forming the sub-pixel area is five, a similar ratio of the width of the one part (one segment) of the sub-pixel to the remaining part (remaining segment) of the sub-pixel appears with a constant period, for example, every (5×4+1) sub-pixels.

FIG. 3 shows the first comparative example 1 of a common multi-view scheme to assist in making the present embodiment understood. In the first comparative example 1 shown in FIG. 3, each sub-pixel area 4 is formed of n sub-pixels with parallax numbers (−2 to 2). In the area on the display surface of the display panel, normal multi-pixel areas 4 each formed of n sub-pixels are repeatedly arranged.

In the three-dimensional image display apparatus of the multi-view type according to Comparative Example 1 described above, dimensions are set as follows. As shown in FIG. 2, the distance from the display surface of the display panel (display apparatus) 1 to a principal point of the optical aperture section 3 (the principal point of the lenticular lens) is denoted by g. The distance from the principal point of the optical aperture section 3 to the viewing space reference plane (viewing space plane) is denoted by L. Here, as shown in FIG. 2, in order to allow a group of light rays from all the lenses to overlap on the viewing space reference plane (viewing space plane) at the finite distance L, the relationship between the pitch Pe (fixed value) of the optical apertures normalized by the sub-pixel width (pp=1) and the average width P of the sub-pixel area 4 corresponding to one optical aperture section needs to satisfy:

$$Pe = P \times L/(L+g) \tag{1}$$

The multi-view or super multi-view type developed from the two-view type is designed such that a light ray group of light rays emitted from all the optical apertures 3 and corresponding to one another are incident (focused) in the same area at the finite distance L at intervals equal to inter pupil distances (IPD) or the inter pupil distances multiplied by 1/x. For example, in FIG. 2, a light ray group of principal rays (shown by solid lines) each passing through the principal point of the optical aperture section 3 is focused on the viewing space reference plane (viewing space plane).

In Comparative Example 1, the viewing space reference plane (viewing space plane) is fixed. In an embodiment described below in comparison with Comparative Example 1, the observer is moved forward or backward from the viewing space reference plane (viewing space plane), and the observation position is varied depending on the shift. In this system, a shift amount Δz is introduced into Expression (1), which is thus modified as follows.

$$Pe = P \times (Lref + \Delta z)/\{(Lref + \Delta z) + g\} \quad (1\text{-}1)$$

Consequently, in the embodiment described below in detail, the width P of the sub-pixel area 4 can be varied depending on the distance (Lref+Δz) to the observer. The distance Lref is a reference distance to the viewing space reference plane. Even if, in Comparative Example 1, the width P is defined to be an integral multiple of the pixel pitch (which also corresponds to the pixel width) pp at the distance Lref, in the embodiment, the width P is not limited to an integral multiple of the pixel pitch (which also corresponds to the pixel width) pp but is defined not to be an integral multiple of the pixel pitch.

Here, when the pixel pitch (which also corresponds to the pixel width) pp is denoted by pp (pp=1 when normalized), the following are given.

$$pp{:}g = IPD/x{:}L (1 \leq x) \quad (2)$$

$$P = n \times pp \text{ (} n \text{ is an integer)}$$

$$P = n \text{ (} n \text{ is an integer; } pp=1 \text{ when normalized)}. \quad (3)$$

Thus, based on Expressions (1) and (3), the following is given.

$$Pe = P \times L/(L+g) = n \times L/(L+g) \quad (4)$$

That is, in the multi-view scheme according to Comparative Example 1, the width P of the sub-pixel area is designed to be n (integer) times as large as the pixel width p (pp=1 when normalized), that is, smaller, by a factor of L/(L+g), than the width (P=n) of a sub-pixel multiplied by n wherein the pixel width of the sub-pixel is acquired by normalizing the pitch Pe of the optical apertures (Pe≠P). The distance L corresponds to a viewing space optimization distance. A scheme adopting the designs expressed by Expressions (2) to (4) is referred to as the multi-view scheme.

In this design, at the distance L, focal points occur at the intervals equal to the inter pupil distances. Thus, even with a relatively small number n of pixels assigned to the aperture section (for example, 2 (=n)), binocular parallaxes enable stereoscopic viewing. However, in the multi-view scheme based on the display, on the display 1, only of the sub-pixel area 4 formed only of an integral number of sub-pixels as shown in FIG. 3, the observation distance L resulting in an extended viewing space is disadvantageously fixed. However, the problem of fixation of the viewing space optimum distance in the multi-view scheme can be solved by the embodiment of the present application in which the sub-pixel area 4 is formed of a non-integral number of sub-pixels to set the sub-pixel width P according to Expression (1-1) as described in detail with reference to FIG. 9 and FIG. 10.

Figure 4:
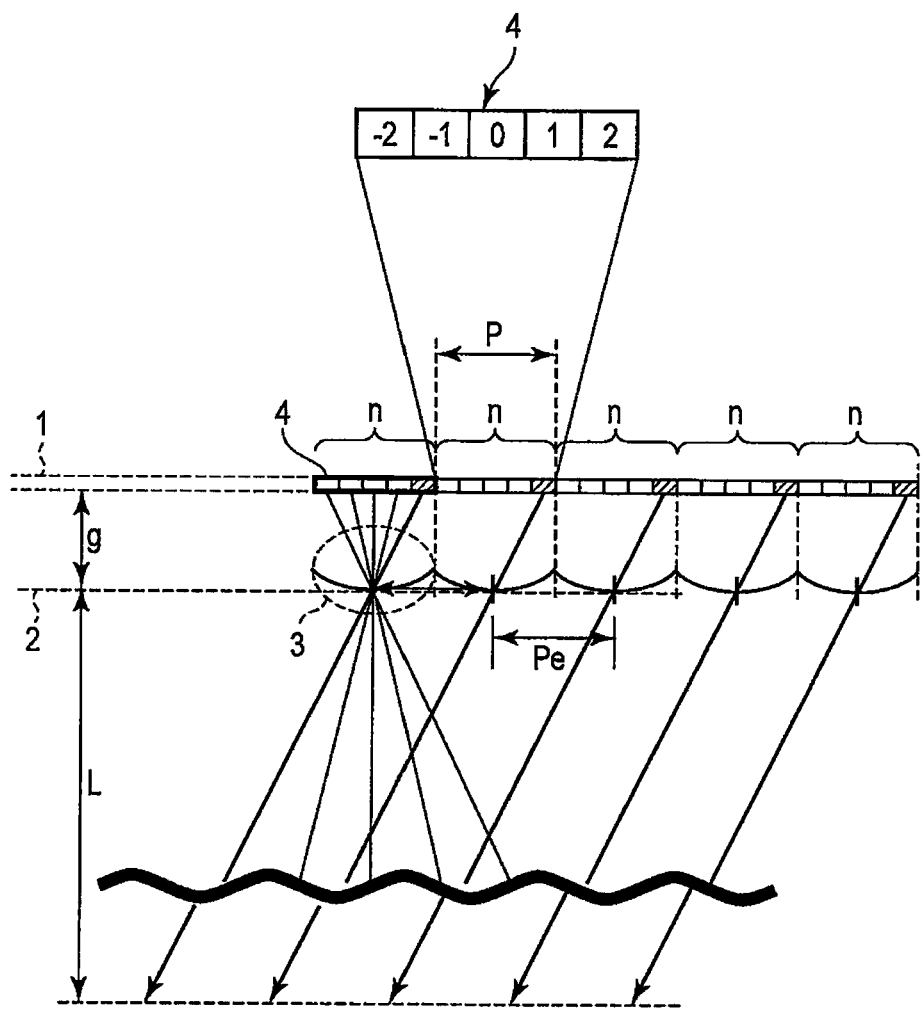
FIG. 4 is a schematic diagram of the three-dimensional image display apparatus shown in FIG. 2, illustrating a second comparative example of II type for description of observation of a three-dimensional image.
Figure 5:
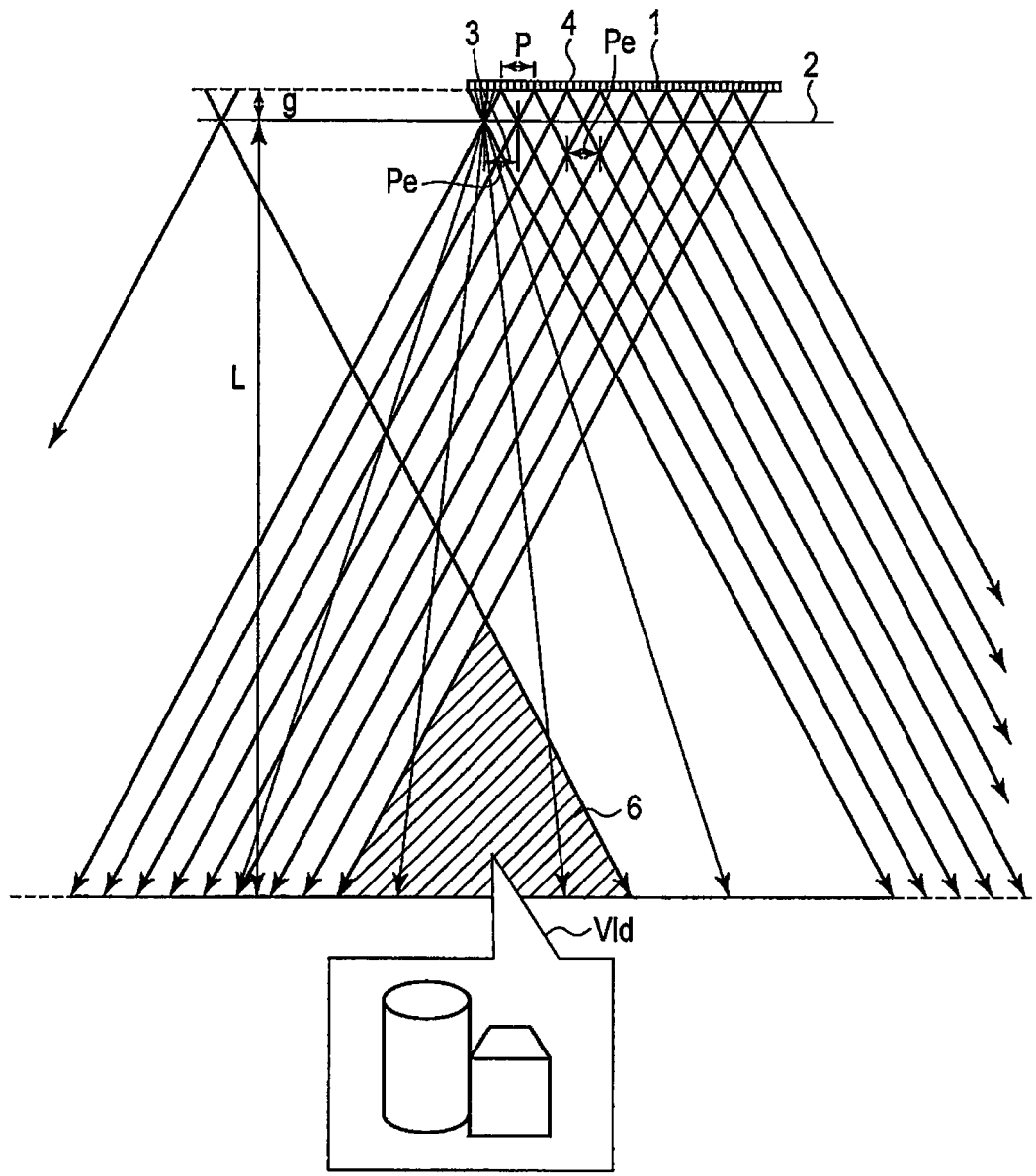
FIG. 5 is a schematic diagram schematically showing trajectories of light rays in the three-dimensional image display apparatus of the II type in FIG. 4.

There is the II scheme in which light rays are so reproduced as to be similar to those from an actual object in contrast to the multi-view scheme. The II scheme focuses on the reproduction of light from an object and thus does not generate focal points on the viewing space plane at the observation distance L as shown in FIG. 4 and FIG. 5. However, the II scheme allows the observation distance L resulting in an extended viewing space to be optionally controlled. In the II scheme according to the second comparative example 2 shown in FIG. 4 and FIG. 5, the sub-pixel areas 4 (each formed of sub-pixels with parallax numbers −2 to 2 by way of example) are similarly set in association with the optical apertures 3 and displayed on the display panel 4 as separate sub-pixel areas 4. The optical apertures 3 are similarly arranged at a constant (fixed) pitch Pe, and as described in Japanese Patent No. 3892808, the pitch Pe of the optical apertures normalized by the width pp of the sub-pixel is set as follows.

$$Pe = n \times pp$$

$$Pe = n (pp = 1) \quad (5)$$

In an example of a design method based on the II scheme, the pitch Pe of the optical apertures 3 is basically set to an integral multiple of the width pp of the sub-pixel. When this setting is used to also set the width P of the sub-pixel area equal to n=5 as in the case of the multi-view scheme, a three-dimensional picture image is observed, in spite of a narrow viewing space, according to the observation position as shown in FIG. 5 by reference numeral V1d.

Figure 7:
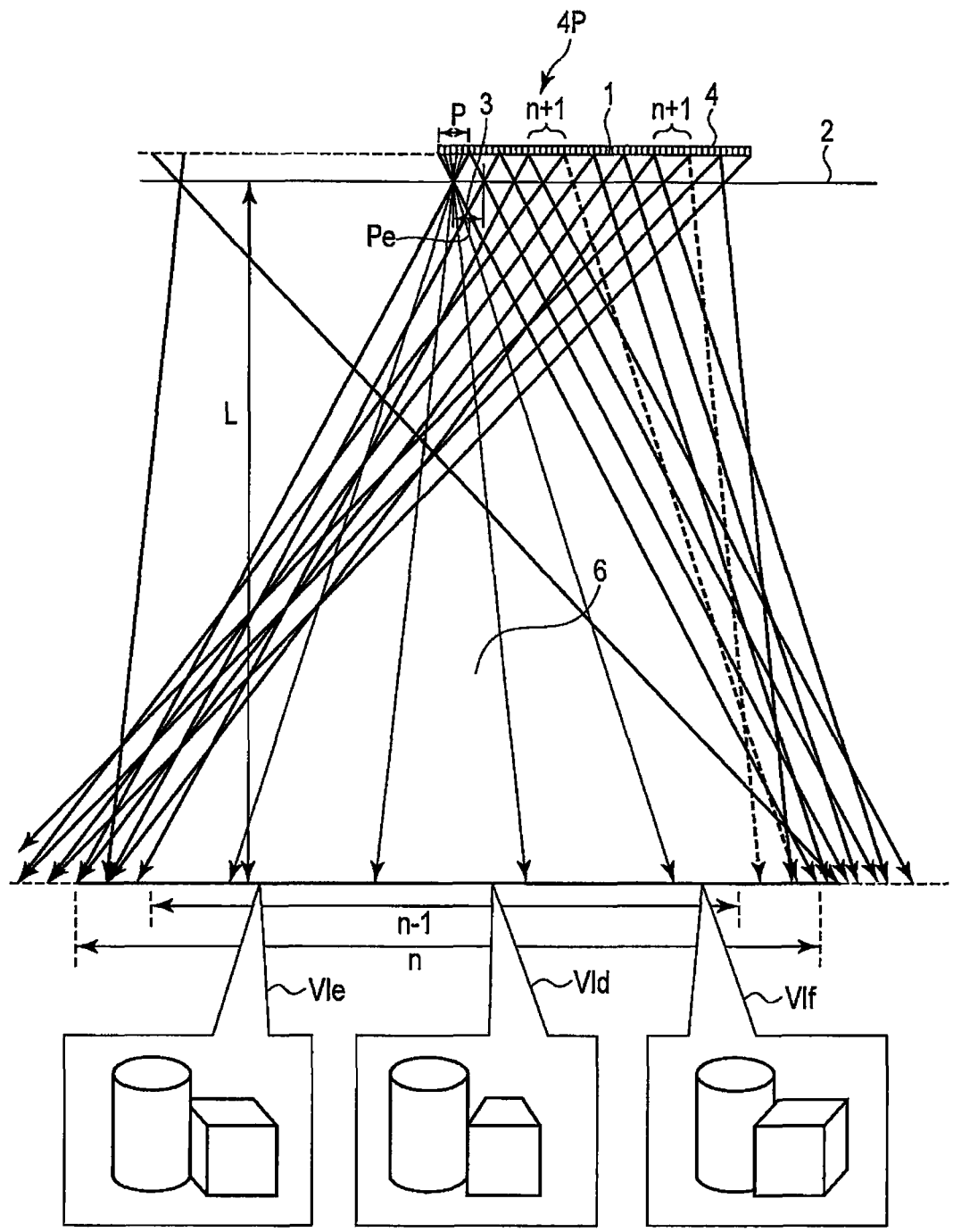
FIG. 7 is a schematic diagram of the three-dimensional image display apparatus shown in FIG. 6, illustrating a third comparative example of the II type for description of observation of a three-dimensional image.

On the other hand, as is the case with the above description of the multi-view scheme, Expression (1) can be satisfied for the finite distance L by setting the number of pixels forming a normal sub-pixel area 4 and a singular sub-pixel area 4P to two values n and (n+1) and adjusting the occurrence frequency m (0≤m<1) of the sub-pixel area 4 formed of (n+1) pixels as shown in FIG. 6 and FIG. 7.

In the third comparative example 3, (n+1) pixels are interposed in an area in which normal sub-pixel areas 4 each formed of n pixels are repeatedly arranged so that pairs of adjacent singular sub-pixel areas 4P are provided on the display panel 1 with a certain period or according to a certain defined arrangement.

That is, m may be set as follows. The following expression is given based on Expressions (1) and (5).

$$P = (L+g)/L \times Pe$$
$$= (L+g)/L \times n$$
$$= n \times (1-m) + (n+1) \times m$$

Both sides of this expression are divided by n.

$$(L+g)/L (n+m)/n \quad (6)$$

Based on Expressions (4) and (5), the width P of the sub-pixel area is designed as follows.

$$P \neq n \quad (7)$$

Then, satisfying Expression (1) or Expression (1-1) allows the viewing space to be extended compared to that shown in FIG. 5, as shown in FIG. 7. Different three-dimensional picture images can be viewed at observation position in the extended viewing space, as shown by reference numerals V1d, V1e, and V1f.

The scheme with no focal point provided at the observation distance L (for example, the focal point is set at infinity) is referred to herein as the II scheme. As is apparent from a comparison with the multi-view scheme, the multi-view scheme focuses a light ray group formed of light rays passing through the optical apertures 3, on the viewing space reference plane, whereas the II scheme prevents a light ray group formed of light rays passing through the optical apertures 3 from being focused on the viewing space reference plane (if the focal point is set at infinity based on Expression (5), the light rays are emitted parallel to one another as shown in FIG. 4).

As described as the second comparative example 2, when the sub-pixel area is formed of only n pixels, the distance at which the light rays from all the lenses overlap is at infinity unlike the observation distance L. This narrows the viewing space at the observation distance L. Hence, as described as Comparative Example 3, the viewing space (the range within which three-dimensional images are visible) can be maximized at the finite observation distance L by setting the number of pixels to one of two values n and (n+1), that is, setting the number of pixels so as to satisfy Expression (6) so that the average value P of the sub-pixel areas satisfies Expression (1). Here, a viewing space angle 2θ and the width VWL of the viewing space (the range within which a three dimensional image is visible) at the observation distance L are defined by:

$$2\theta = 2 \times a\tan(P \times pp/2/g) \quad (8)$$
$$= 2 \times a\tan(VWL/2/L)$$

However, with the viewing space optimization applied, the viewing space width is apparently slightly smaller than a value determined by Expression (8). This problem with Comparative Example 3, that is, the narrowed viewing space, can be solved by the embodiment described below. The phenomenon of the narrowed viewing space resulting from the viewing space optimization in the II scheme will be described below.

First, the viewing space in the multi-view scheme will be described. FIG. 3 shows trajectories of light rays in a multi-view apparatus in which P=n=5, with some lenses and sub-pixels shown enlarged. Light rays from the pixels are focused at the observation distance L by setting the aperture pitch Pe slightly smaller than the area width P. The focusing of the light rays is shown by the pixel located at the right end of the sub-pixel area 4 (parallax image number 2). Here, sub-pixels with the same parallax image number, for example, the parallax image number 2 mean that the sub-pixels belong to a signal viewpoint image (the image taken at a certain viewpoint). If the viewpoint images are parallel projection images, the same parallax image number means that the images are taken in the same direction. If the viewpoint images are perspective projection images, the same parallax image number means that the images are taken in the same position. In either case, the intersection point between each of the sub-pixels with the same parallax image number and the principal point of the corresponding optical aperture section 3 basically corresponds to a position where a viewpoint image is acquired. However, it should be noted that if various image processing are carried out, the intersection point may be intentionally shifted from the acquisition position. Light rays with different parallax image numbers similarly form focal points at the observation distance L at intervals determined by Expression (2), though this is not shown in the drawings.

Figure 8:
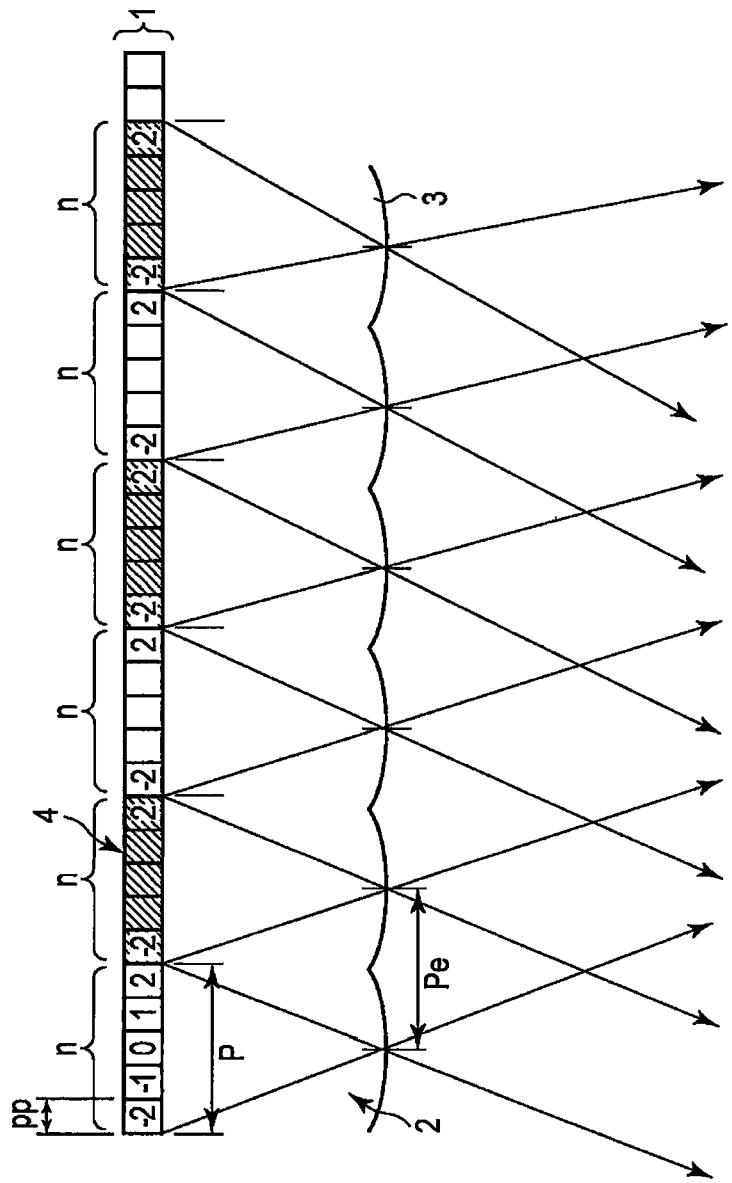
FIG. 8 is a schematic diagram illustrating the relationship between sub-pixels and an aperture pitch according to the first or second comparative example.

On the other hand, FIG. 4 shows trajectories of light rays in a II-type apparatus satisfying Expression (5) and in which P=n=5, with some lenses and sub-pixels shown enlarged. Light rays from the pixels each located at the right end of the sub-pixel area 4 (parallax image number 2) are incident on the reference plane with the intervals Pe maintained even at the observation distance L. The trajectories of light rays mean that viewpoint images need to be acquired by means of parallel light rays. As shown in FIG. 8, light rays with different parallax image numbers are also projected to the viewing space reference plane at the observation distance L at the intervals Pe. That is, the ranges of light rays from the lenses are shifted by the interval Pe upon entering the reference plane at the observation distance L. As a result, the viewing space is significantly narrowed as shown in FIG. 5. FIG. 7 shows trajectories of light rays in a configuration similar to that in FIG. 4 and in which the viewing space is optimized so that the singular sub-pixel areas each formed of (n+1) pixels are interposed among the sub-pixel areas. At the opposite sides of the singular sub-pixel area 4 formed of (n+1) pixels, the direction of the light ray emitted from the sub-pixel area 4 can be shifted. FIG. 7 shows that the light ray (shown by a dashed line) from the right side of the sub-pixel area 4 is emitted more leftward than that from the left side of the sub-pixel area 4. As a result, as shown in FIG. 7, the viewing space can be extended.

When the basic sub-pixel area 4 is formed of n pixels (for example, five pixels with parallax numbers −2 to 2), the incidence ranges within which light rays traveling from the sub-pixel areas 4 to the viewing space reference plane are sequentially shifted by the internal Pe of the optical apertures 3. Here, it is assumed that the absolute value (|VWLshift|) of a shift from the design value (VWL) of the range of incidence positions on the viewing space reference plane is as follows.

$$|VWLshift| > |P \times pp \times (L/g) \times \tfrac{1}{2}|$$

Then, when a sub-pixel area formed of (n+1) pixels (here, six pixels) is generated, the incidence range is shifted at the observation distance L by a range (pp×L/G) corresponding to one pixel in a direction to cancel a shift of the incidence range by the interval Pe of the optical apertures 3. Repetition of this shift allows the viewing space to be extended. However, one parallax is consumed by the shift of the incidence range of light rays, with the remaining (n−1) parallaxes utilized as a viewing space. That is, only a part VWL×(n−1)/n of the viewing space width VWL defined by Expression (8) is effectively utilized as a viewing space.

The inventors have clarified the above-described mechanism of the narrowed viewing space and confirmed that an embodiment with measures described below is effective for preventing the viewing space from being narrowed. That is, as a result of focus on the control of the incidence range of light rays traveling from all the lenses to the viewing space reference plane based on image information displayed in the sub-pixels instead of the control of the incidence range in sub-pixel units, the viewing space can be more accurately controlled. More specifically, as described above, a sub-pixel is separated into segments, and pixels formed of the segments are provided with a mixture of lightness values (image information). To clarify the difference between the existing method and an embodiment with the above-described concept applied thereto, FIG. 8 to FIG. 10 schematically illustrate the relationship between the sub-pixel pitch pp and the width P of the sub-pixel area 4 determined based on FIG. 1 and Expression (1).

As described above, even with a three-dimensional image display apparatus of the multi-view type designed with the observation distance Lref fixed, if an attempt is made to maximize the viewing space based on the observation distance L when the observer is moved forward or backward from the position of the observation distance Lref, Expression (3) can no longer be satisfied. Hence, processing will be described below which maximizes the viewing area at an observation position failing to satisfy Expression (3) regardless of whether the multi-view scheme or the II scheme is used.

FIG. 8 shows trajectories of light rays in a typical image display apparatus in which the width P of the sub-pixel area 4 is configured to be an integral multiple of the sub-pixel pitch pp. The boundaries between the sub-pixel areas 4 coincide with the boundaries between the sub-pixels. Almost all the light rays from the sub-pixel area are directed to the opposite optical aperture section 3 and then to the observer via the optical aperture section 3. All the sub-pixel areas 4 are in a correspondence relationship with the respective optical apertures 3. In FIG. 8, the pitch Pe of the optical apertures is set slightly smaller than the sub-pixel pitch pp multiplied by n, making the light rays appear focused at a finite distance. However, this focal point does not necessarily coincide with the observation position L.

Figure 10:
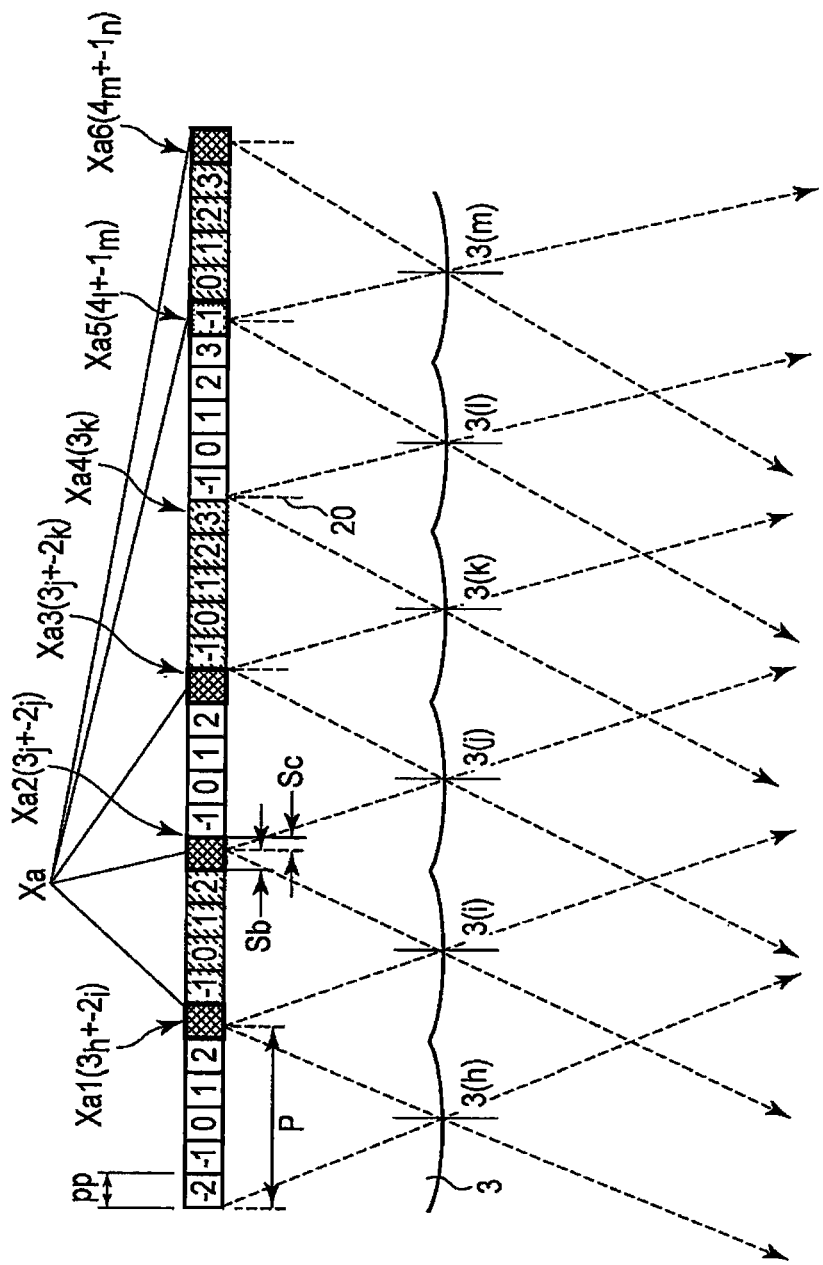
FIG. 10 is a schematic diagram illustrating the allocation of sub-pixels applied to the three-dimensional image display apparatus according to the embodiment and sub-pixel information provided to the sub-pixels.

FIG. 9 and FIG. 10 show an embodiment in which viewing space optimization is applied at a focusing distance determined based on the structure shown in FIG. 8, that is, an observation distance L shorter than the distance corresponding to the maximum viewing space determined based on P=n (in an example of design for the II scheme, the focal point is set at infinity, so all finite distances correspond to this observation distance L. In the multi-view scheme, in which the focal point is set at a finite distance, a distance shorter than this finite distance corresponds to the observation distance L). For simplification of description, in the present embodiment, dashed lines indicate the area width P of the sub-pixel area 4 set to 5.25 (for convenience of description, the value of the width has no unit of quantity) and the ideal viewing space for each optical aperture section. Compared to the width P of the sub-pixel area 4 set to 5, the width P is further larger than the aperture pitch Pe (P>Pe). The viewing space is maximized at a shorter distance. At this time, each sub-pixel area 4 is not formed of an integral number of sub-pixels as shown in FIG. 8. A viewing space optimization process is carried out to substantially periodically interpose singular sub-pixel areas 4P among the normal sub-pixel areas 4 as shown in FIG. 9 so that such characteristics as shown by solid lines are achieved so as to be similar to the characteristics shown by dashed lines. On the other hand, in the present application, as shown in FIG. 10, sub-pixel areas 4 each with a width equal to the sub-pixel width P multiplied by a non-integer are configured as follows with relevant sub-pixels separated as shown by dashed lines 20. Each sub-pixel area 4 comprises five sub-pixels and a part of one sub-pixel (sub-pixel segment) or four sub-pixels as well as a part of one sub-pixel (segment) and the remaining part of the sub-pixel (remaining segment), thus achieving an arrangement at an equal pitch P, that is, the characteristics indicated by the dashed lines. This configuration allows the viewing area to be more accurately extended at a shorter distance than the configuration in which the singular sub-pixel areas 4P are periodically interposed. A sub-pixel Xa positioned at the boundary between the sub-pixel areas 4 cannot be physically further divided into smaller pieces. However, assuming that the sub-pixel Xa can be divided into segments, pixel information is provided and displayed which would be obtained by mixing, in the ratio of the segments, pieces of information to be displayed if the segments were present.

More specifically, in FIG. 9, when focus is placed on a sub-pixel area specified by reference numeral Xa2, a pixel segment corresponding to the half of the sub-pixel (the ratio of 0.5) is ideally contained in the sub-pixel area 4 denoted by reference numeral 24 and is assigned with the parallax number −2. On the other hand, a pixel segment corresponding to the remaining half (the remaining ratio of 0.5) is contained in the adjacent sub-pixel area 4 shown by reference numeral 23 and is assigned with the parallax image number 3. However, the viewing space optimization process determines that the pixel segments are contained in one of the sub-pixel areas, for example, in the sub-pixel area 23 for Sb>Sc and in the sub-pixel area 24 for Sb≤Sc (instead of the cases of Sb>Sc and Sb≤Sc in FIG. 9, the cases of Sb≥Sc and Sb<Sc may be used). In FIG. 9, the left end of the sub-pixel area 4 positioned at the left end of the array is set to be the start point of the width P of the sub-pixel area. The P of the sub-pixel area 4 is set to 5.25. More specific description will be given with reference to the example illustrated in FIG. 9. Among the sub-pixels positioned at the boundaries between the sub-pixel areas, the first pixel Xa1, the leftmost pixel in FIG. 9, belongs to the right sub-pixel area 4 because the sub-pixel is separated such that Sb:Sc=0.25:0.75. The next, second pixel Xa2 belongs to the right sub-pixel area 4 because the sub-pixel is separated such that Sb:Sc=0.5:0.5. Moreover, the next, third pixel Xa3 belongs to the left sub-pixel area 4 because the sub-pixel is separated such that Sb:Sc=0.75:0.25, indicating that the magnitude relationship between the distances Sb and Sc is inverted. The sub-pixel areas 4 are selected as described above, thus allowing the incidence ranges of light rays on the viewing space reference plane defined at the distance L to substantially coincide with the original incidence ranges.

FIG. 10 according to the embodiment is a schematic diagram generally illustrating a technique to display pieces of parallax information belonging to both sub-pixel areas and mixed together in a ratio corresponding to the position of the boundary P between the sub-pixels, in contrast to the above-described embodiment for binary determination in which to which of the sub-pixel areas the sub-pixel belongs is determined depending on the position of the boundary P between the sub-pixels. In a structure similar to that shown in FIG. 8 and FIG. 9, the technique according to the embodiment is applied to a distance L shorter than the one at which the viewing space determined by the structure is maximized. For simplification of description with reference to FIG. 10, the sub-pixel area P is assumed to be set to 5.25.

In FIG. 10, for the sub-pixel Xa positioned between the sub-pixel areas 4, based on the relative relationship between the boundary between the sub-pixel areas 4 and the corresponding sub-pixel Xa, the ratio in which the images for the sub-pixel Xa are mixed together is set for the case where the sub-pixel Xa belongs to the respective two sub-pixel areas 4, as described with reference to FIG. 9. That is, the sub-pixel Xa is assumed to belong to each of the two sub-pixel areas 4, and the mixture ratio is determined in terms of the widths or areas of segments into which the sub-pixel is further divided. In the example of allocation shown in FIG. 10, the left end of the sub-pixel area 4 positioned at the left end of the array is set to be the start point of the width P of the sub-pixel area. The P of the sub-pixel area 4 is set to 5.25. FIG. 10 shows optical apertures 3($h$) to 3($m$) and sub-pixel areas 4 corresponding to the optical apertures 3($h$) to 3($m$). Furthermore, sub-pixels Xa1 to Xa6 are located at the boundaries between the sub-pixel areas 4. The sub-pixels Xa1 to Xa6 carry information in parentheses which indicates that the corresponding pieces of parallax information (here, numbers are indicative of parallax numbers, and suffixes are indicative of corresponding optical apertures) are mixed together. By way of example, for a sub-pixel Xa1 (3$h$+(−2i)), it is assumed that parallax information with the parallax number 3 passes through the optical aperture 3($h$) and that parallax information with the parallax number (−2) passes through the optical aperture 3(*i*). At the same time, for the sub-pixel Xa5 (4*l*+(−1*m*)), it is assumed that parallax information with the parallax number 4 passes through the optical aperture 3(*l*) and that parallax information with the parallax number (−1) passes through the optical aperture 3(*m*).

In the embodiment shown in FIG. 10, among the sub-pixels Xa positioned at the boundaries between the sub-pixel areas, the first pixel Xa1 (3*h*+(−2*i*)), the leftmost pixel in FIG. 10, involves the following mixture. Since the first sub-pixel Xa1 (3*h*+(−2*i*)) is separated such that Sb:Sc=0.25:0.75, the ratio of the piece of parallax information 3 (the information assumed to pass through the aperture 3*h*) to the piece of parallax information −2 (the information assumed to pass through the aperture 3*i*) is set to 0.25:0.75 or a value determined also taking a luminosity factor into account and the pieces of information are mixed in this ratio; the piece of parallax information 3 is to be provided to the first sub-pixel Xa1 in the left sub-pixel area 4 if the first sub-pixel Xa1 belongs to the left sub-pixel area 4 and the piece of parallax information −2 is to be provided to the first sub-pixel Xa1 in the right sub-pixel area 4 if the first sub-pixel Xa1 belongs to the right sub-pixel area 4. Since the next, second sub-pixel Xa2 (3*i*+(−2*j*)) is separated such that Sb:Sc=0.5:0.5, the ratio of the piece of parallax information 3 (the information assumed to pass through the aperture i) to the piece of parallax information −2 (the information assumed to pass through the aperture j) is set to 0.5:0.5 or a value determined also taking the luminosity factor into account and the pieces of information are mixed in this ratio; the piece of parallax information 3 is to be provided to the second sub-pixel Xa2 in the left sub-pixel area 4 if the first sub-pixel Xa1 belongs to the left sub-pixel area 4 and the piece of parallax information −2 is to be provided to the second sub-pixel Xa2 in the right sub-pixel area 4 if the second sub-pixel Xa2 belongs to the right sub-pixel area 4. This setting allows the incidence ranges of light rays at the distance L to coincide with the original incidence ranges, while avoiding the phenomenon in which the viewing space width decreases to (n−1)/n when the viewing space optimization is applied.

As is apparent from FIG. 9, when the viewing space is optimized, a decrease in the distance to the sub-pixel area 4 formed of (n+1) pixels increases the deviation between the boundaries between the sub-pixel areas 4 and the actual boundaries between the pixels (the boundary between the sub-pixel areas 4 corresponds to the middle of the corresponding sub-pixel), thus more significantly narrowing the viewing space. In view of this, the viewing space can be effectively extended simply by the following method: only for a sub-pixel Xa located very close to a position where a sub-pixel area 4 formed of (n+1) pixels is generated if the viewing space optimization is applied, images for the cases where the sub-pixel belongs to each of the two sub-pixel areas are mixed together so as to reflect the relative relationship between the boundary between the sub-pixel areas 4 and the corresponding sub-pixel Xa.

As described with reference to FIG. 8 to FIG. 10, it is possible to apply to not only the II scheme according to the present embodiment (the scheme involving the relationship expressed by Expression (7)) but also the multi-view scheme (which involves the relationship expressed by Expression (3)). That is, the set distance determined based on the structure is equal to the visual distance in the multi-view scheme and is different from the visual distance in the II scheme. However, the technique according to the embodiment allows the viewing space to be extended to an observation distance L deviating from the set distance determined based on the structure.

Figure 11:
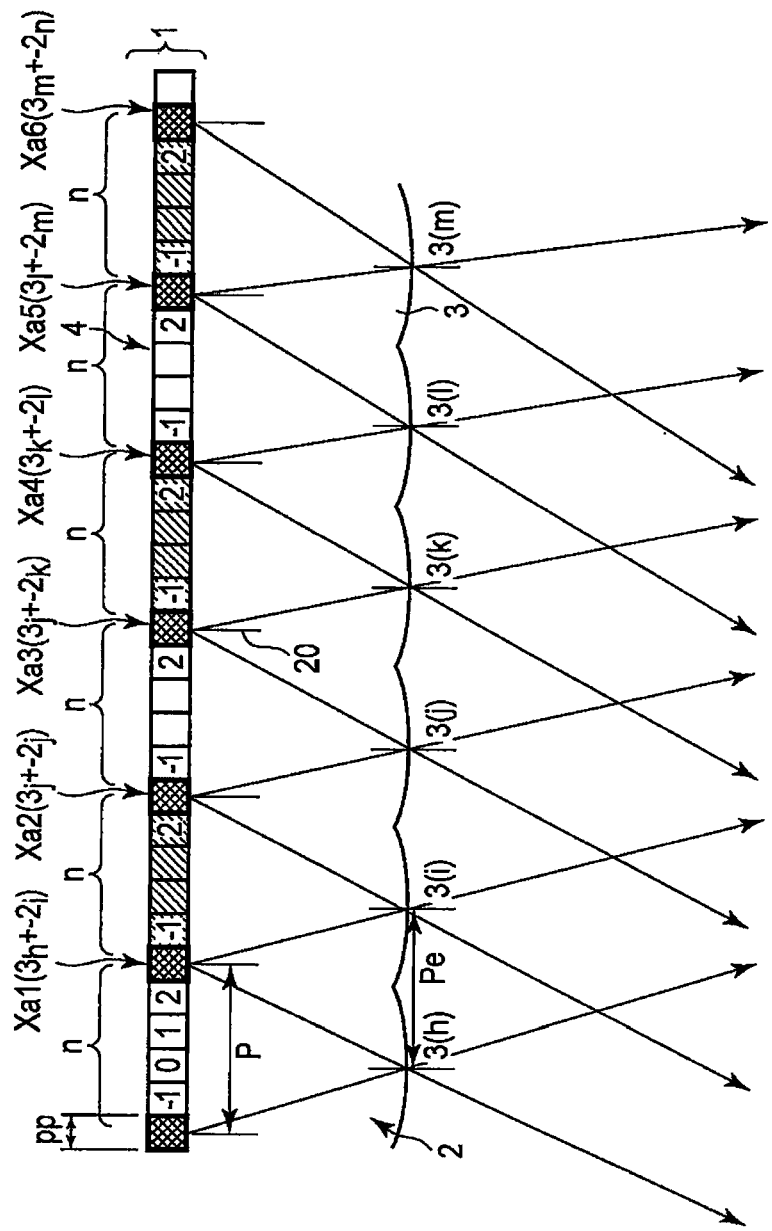
FIG. 11 is a schematic diagram illustrating the allocation of sub-pixels applied to the three-dimensional image display apparatus according to the embodiment and sub-pixel information provided to the sub-pixels.

Furthermore, if the observer located at the observation distance L according to the relationship determined by Expression (3) moves forward or leftward and the viewing space is to be correspondingly consecutively shifted (in steps smaller than sub-pixel units), the technique in the present application is effective on the multi-view scheme. FIG. 11 shows that the width P of the sub-pixel area is shifted by the half of the sub-pixel width, with n maintained at 5 for a comparison with the case illustrated in FIG. 8 and in which n=5. Reference numerals similar to those shown in FIG. 10 are used in FIG. 11. Thus, the description of an embodiment shown in FIG. 11 is omitted.

In the embodiments shown in FIG. 1 to FIG. 11, only the inside of the plane (horizontal plane) in the first direction (horizontal direction or the longitudinal direction of the display) is focused on, and the image display in the sub-pixel areas is described. However, the actual optical apertures 3 are extended in the second direction (the vertical direction or the lateral direction of the display). Furthermore, the extension direction of the optical apertures 3 may form a certain angle to the direction in which the sub-pixels are formed. An embodiment will be described in detail in which the thus extended optical apertures 3 are taken into account.

In the apparatus shown in FIG. 1, the optical apertures 3 are extended in the second direction (vertical direction). In a common flat panel display, the sub-pixels are formed to extend in the second direction, and the sub-pixel areas 4 are extended in the second direction. If the extension in the second direction is taken into account, the already discussed concept for the first direction may be applied to the second direction to display pixel information in the sub-pixel areas 4.

Figure 12A:
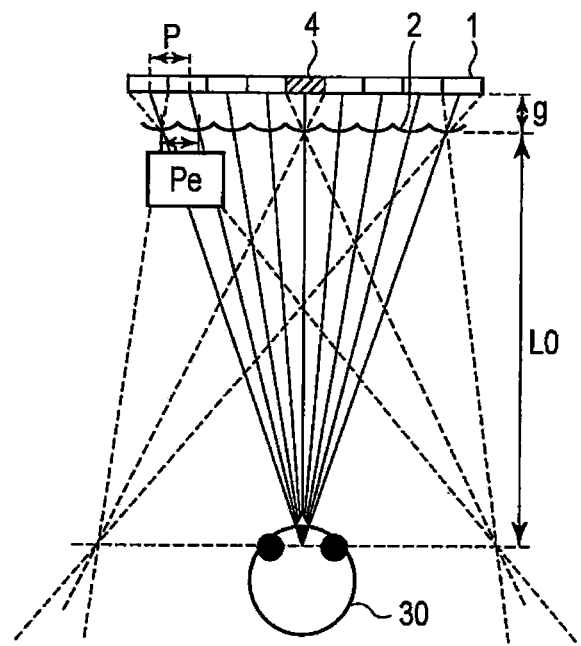
FIG. 12A is a schematic diagram showing sub-pixel areas in a horizontal plane in the three-dimensional image display apparatus according to the embodiment in which an observer is positioned at a reference plane defined at a certain viewing distance.
Figure 12B:
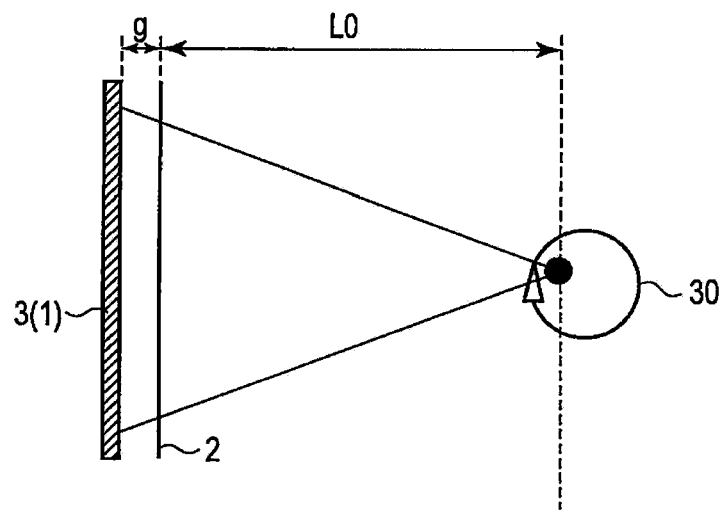
FIG. 12B is a schematic diagram showing sub-pixel area in a vertical plane in the three-dimensional image display apparatus according to the embodiment in which the observer is positioned at the reference plane defined at the certain viewing distance.

FIGS. 12A to 12C schematically show sub-pixel areas 3 in a display apparatus comprising a light ray control element 2 with vertically extended optical apertures 3. As shown in FIGS. 12A and 12B, an observer 30 is positioned at a reference position in a plane located at a reference distance L0 from the display apparatus. Here, FIG. 12A schematically shows trajectories of light rays in a horizontal cross section (the cross section taken along the first direction). FIG. 12B schematically shows trajectories of light rays in a vertical cross section (cross section taken along the second direction). Furthermore, FIG. 12C is a perspective view of the apparatus with the light ray control element 2 removed which is otherwise located in the front of the apparatus, and shows the shape of the sub-pixel area 4. The sub-pixel area 4 corresponding to one light ray control element 2 is rectangular. For the sub-pixel area 4 extended in the second direction, the application of the above-described embodiments is not required only if the relationship expressed by Expression (3) is satisfied at the distance L0 at which the viewing space is maximized and the sub-pixel areas 4 coincide with the pixel boundaries. In the other cases including the one where the viewing space is to be shifted rightward or leftward from the range of formation of the focal point determined based on the structure, the viewing space can be maximized by applying the processing according to the above-described embodiments.

FIG. 13A to FIG. 13C show trajectories of light rays observed if the viewing space is to be maximized at a closer observation position, that is, if the observer 30 moves closer to the apparatus so that the resultant observation distance L1 is shorter than the observation distance L0. The position of the observer 30 is detected by a position sensor 5 shown in FIG. 1. The width P of the sub-pixel area 4 is set to be larger according to Expression (1) as shown in FIG. 13C. Thus, the boundaries between the sub-pixel areas 4 fail to coincide with the actual boundaries between the sub-pixels. To maximize the viewing space, the boundary pixel between the sub-pixel areas 4 is divided into segments to increase the width P of each sub-pixel area 4.

Figure 14A:
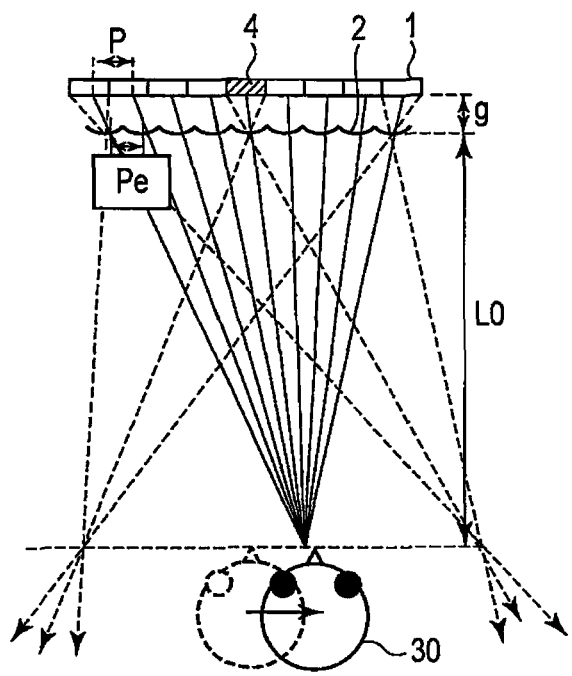
FIG. 14A is a schematic diagram showing the sub-pixel areas in the horizontal plane in the three-dimensional image display apparatus according to the embodiment in which the observer is shifted on the reference plane defined at the position of the visual distance in FIG. 12.
Figure 14B:
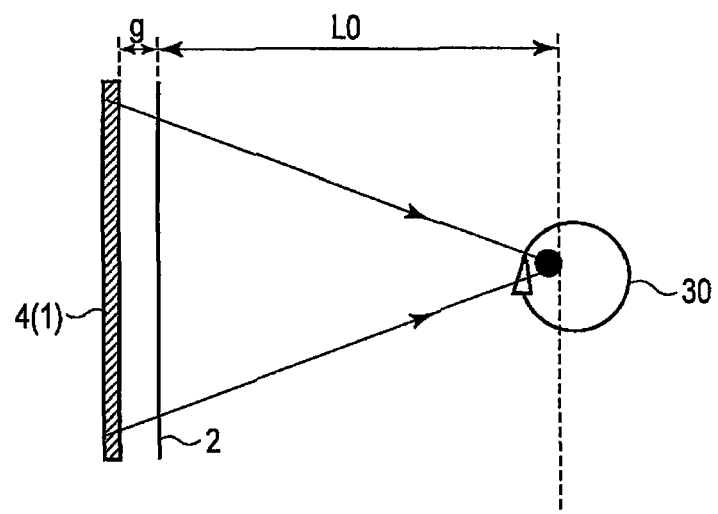
FIG. 14B is a schematic diagram showing the sub-pixel areas in the vertical plane in the three-dimensional image display apparatus according to the embodiment in which the observer is shifted on the reference plane defined at the position of the visual distance in FIG. 12.

FIG. 14A to FIG. 14C show that, for example, the observer positioned as shown in FIG. 12A moves rightward in a horizontal cross section in FIG. 14A. Similarly, the rightward movement of the observer 30 is detected by the position sensor 5 shown in FIG. 1. With respect to a shift Δx from the reference position of the observer, a shift Δx of the sub-pixel area 4 is given by:

$$\Delta x p = g/L \times \Delta x \qquad (9)$$

As shown in FIG. 14C, the shift direction of the sub-pixel area 4 is opposite to the moving direction of the observer. Even with P set equal to n in the multi-view scheme, as described above with reference to FIG. 11, the shift of the observer 30 prevents the boundaries between the sub-pixel areas 4 from coinciding with the boundaries between the sub-pixels. Thus, the boundary pixel between the sub-pixel areas is divided into segments to set the width of the sub-pixel area 4 in accordance with to Expression (1) described above.

Figure 15:
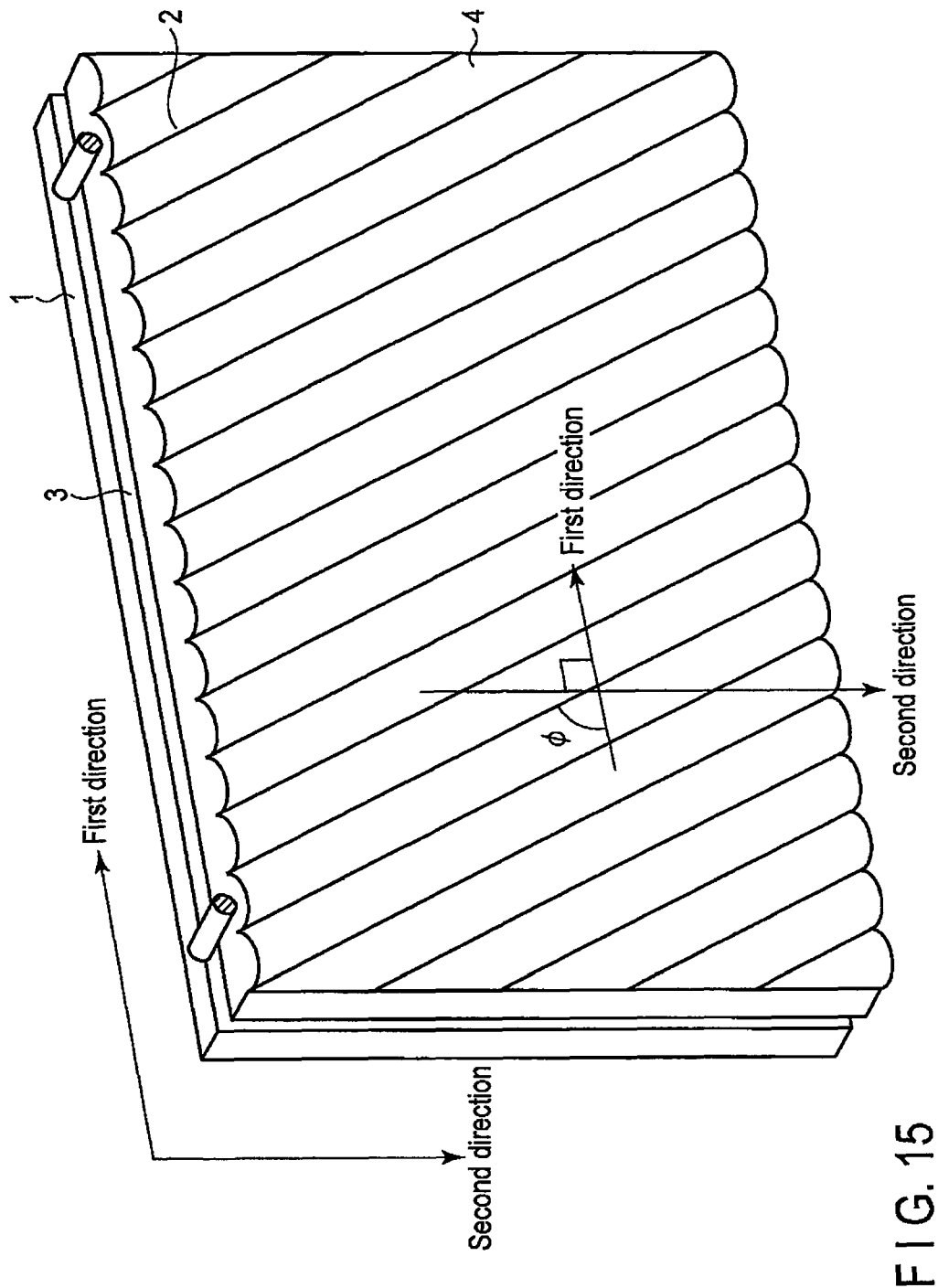
FIG. 15 is a perspective view schematically showing a perspective view schematically showing the structure of a three-dimensional image display apparatus enabling three-dimensional images to be observed in an auto-stereoscopic manner (glasses-free type) according to another embodiment.
Figure 16A:
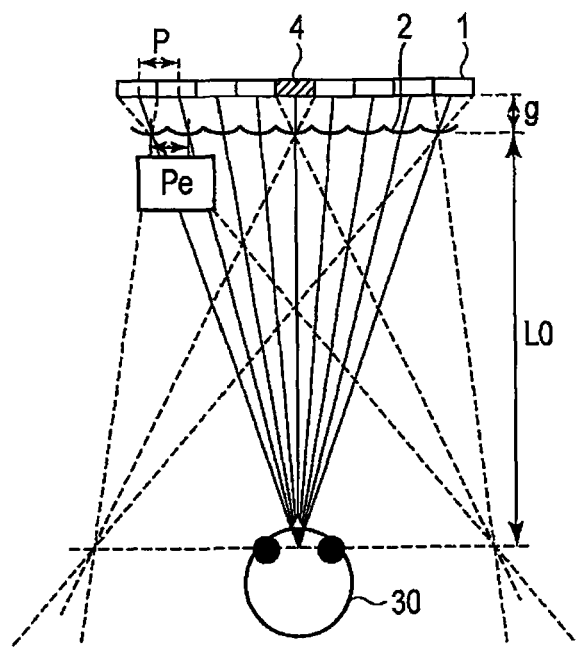
FIG. 16A is a schematic diagram showing sub-pixel areas in a horizontal plane in the three-dimensional image display apparatus shown in FIG. 15 and in which the observer is positioned at a reference plane defined at a certain visual distance.
Figure 16B:
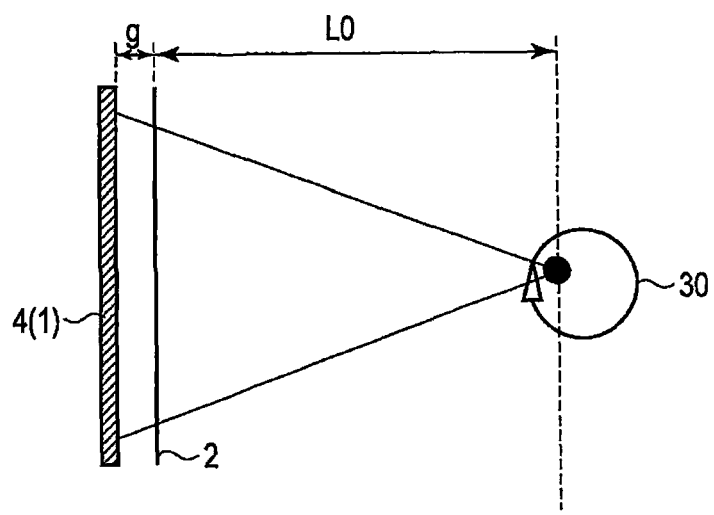
FIG. 16B is a schematic diagram showing the sub-pixel areas in a vertical plane in the three-dimensional image display apparatus shown in FIG. 15 and in which the observer is positioned at the reference plane defined at the certain visual distance.

FIG. 15 shows a three-dimensional image display apparatus according to yet another embodiment. In the apparatus shown in FIG. 15, optical apertures 3 of a light ray control element 2 are arranged at an angle φ to the first direction (horizontal direction). FIG. 16A and FIG. 16B show trajectories of light rays from the light ray control element 2 in the apparatus shown in FIG. 15 and comprising the optical apertures 3 extended at the angle φ to the first direction (horizontal direction). In the apparatus shown in FIGS. 16A and 168, each sub-pixel area 4 is extended at an angle to the first direction as shown in FIG. 16C. Here, FIG. 16A shows trajectories of light rays from the display apparatus in a horizontal cross section. FIG. 16B shows trajectories of light rays from the display apparatus in a vertical cross section. FIG. 16C is a perspective view of the display apparatus with the light ray control element 2 in the front thereof removed, and shows the shape of the sub-pixel area 4. Since the sub-pixel area 4 corresponding to one light ray control element 2 is rectangular, no sub-pixel area 4 coincides with the pixel boundary. Hence, the viewing space is maximized by dividing the boundary pixel between the adjacent sub-pixel areas 4 into segments and deriving an area S using the width P of each sub-pixel area 4 in accordance with Expression (1) described above. This will be described below in detail with reference to FIG. 22.

Figure 17A:
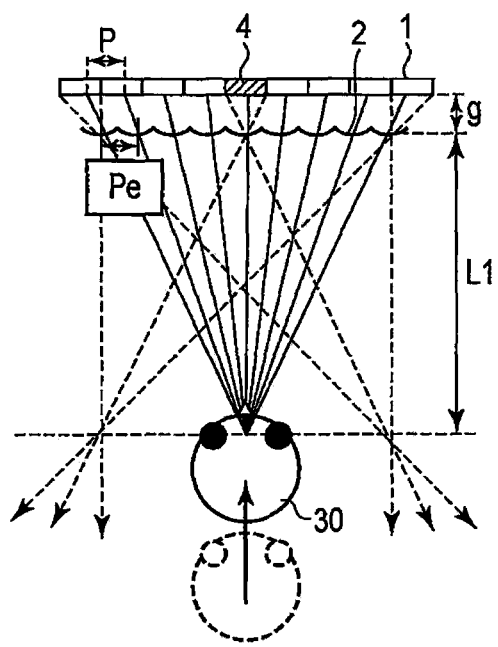
FIG. 17A is a schematic diagram showing the sub-pixel areas in the horizontal plane in the three-dimensional image display apparatus shown in FIG. 15 and in which the observer is positioned away from the reference plane defined at the position of the visual distance in FIG. 16.
Figure 17B:
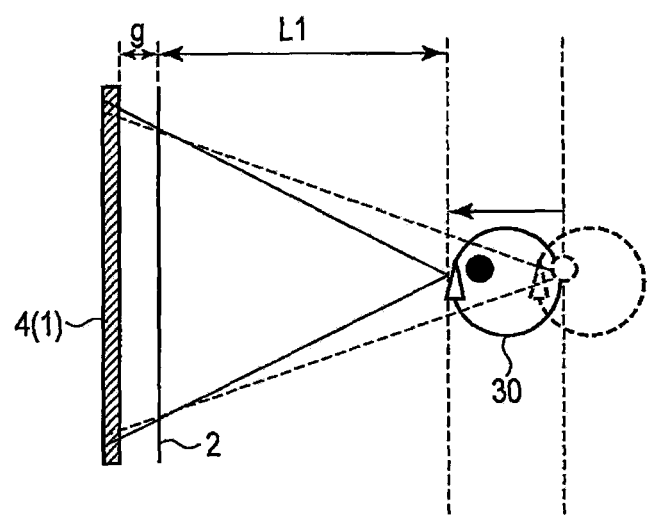
FIG. 17B is a schematic diagram showing the sub-pixel area in the vertical plane in the three-dimensional image display apparatus according to the embodiment in which the observer is positioned away from the reference plan defined at the position of the visual distance in FIG. 16.
Figure 17C:
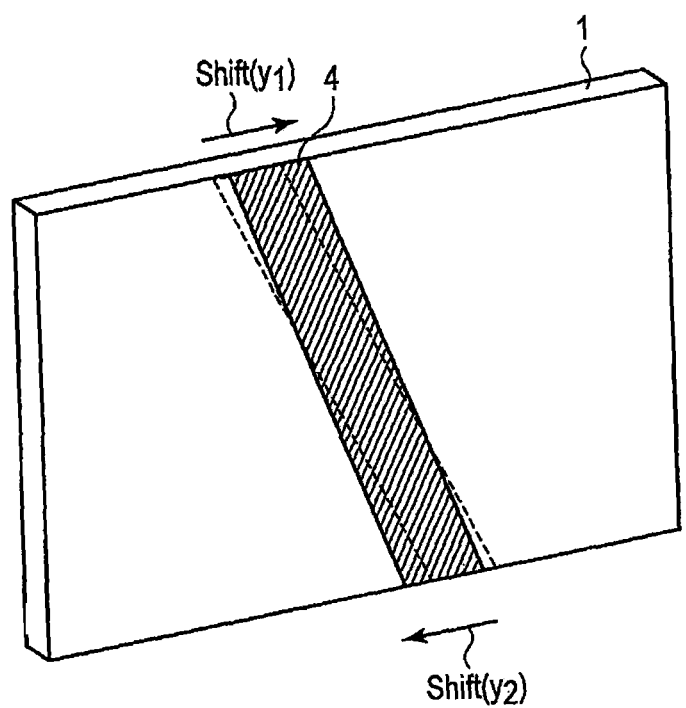
FIG. 17C is a schematic diagram showing the display panel in the case where the observer is positioned as shown in FIG. 17A and FIG. 17B and the certain sub-pixel area shown extended on the display panel.

FIG. 17A to FIG. 17C show trajectories of light rays observed if the viewing area is to be maximized at a closer observation position, that is, if the observer moves closer to the apparatus so that the resultant observation distance L1 is shorter than the observation distance L0. The position of the observer 30 is detected by the position sensor 5. Then, the viewing space can be maximized by increasing the width P of the sub-pixel area 4 in accordance with Expression (1) and varying the inclination of the sub-pixel area 4 as shown in FIG. 17C.

FIGS. 18A and 18B are schematic diagrams illustrating, in further detail, the change in the sub-pixel area 4 shown in FIG. 17C. FIG. 18A shows trajectories of light rays in a display vertical plane. FIG. 18B is an enlarged schematic view of the sub-pixel area 4. In FIGS. 18A and 18B, blank circles indicate the position of a certain sub-pixel area observed on the display panel 1 when the observer 30 is positioned at infinity. A bidirectional arrow under each of the blank circles indicates the range of the sub-pixel area required to maximize the viewing space around the observation position at which the blank circle is set. Filled-in circles indicate positions on the display panel 1 observed via the same optical aperture section 3 when the observer moves to a position shown by a solid line in FIG. 17A and FIG. 17B. A bidirectional arrow under each of the filled-in circles indicates the range of the sub-pixel area required to maximize the viewing space around the observation position. Here, the inclination of the lenses is denoted by φ, and the visual distance is denoted by L. Then, the inclination α of the sub-pixel area 4 is determined as follows.

If visibility is not taken into account (the observer 30 is positioned at infinity), the inclination α is equal to φ. However, if the display is observed at a finite distance, when the visibility is taken into account, the observer observes a position located above or below a position immediately behind the optical aperture section through which the light ray has passed. If the display is observed at a finite distance L, the range of the sub-pixel area 4 to be set in order to maximize the viewing space from the assumed optical aperture section 3 with the visibility taken into account is as shown by the arrow under the filled-in circle when a shift s in the observation position in the y direction is taken into account. At this time, the following relationship holds true.

$$(yd+s):yd=(L+g):L=\tan\alpha:\tan\phi \qquad (10)$$

Modifying the sub-pixel area in accordance with this relationship allows the viewing space to be restrained from being narrowed in the vertical direction (second direction) even at a short visual distance. If the distance L is large, s≅0 and α≅φ. If the distance L is small, s>0 and α<φ (the inclination is closer to vertical). In this case, the initial value of inclination of the sub-pixel area is calculated to be the angle φ corresponding to the case where the display is observed at infinity. However, the angle α corresponding to the following case may be determined in accordance with Expression (10): the inclination of the lenses is fine-tuned at the finite observation distance L so as to maximize the viewing space in conjunction with the sub-pixel areas with the inclination φ, and the visual distance is then reduced or increased.

As shown in FIG. 18B, the corresponding sub-pixel area is shifted not only in the first direction (horizontal direction) but also in the second direction (vertical direction) by the distance s. Thus, in response to this shift, parallax images may be shifted by the distance s. However, no parallax is originally applied in the second direction, and the shift makes the observer feel little discomfort.

Figure 19A:
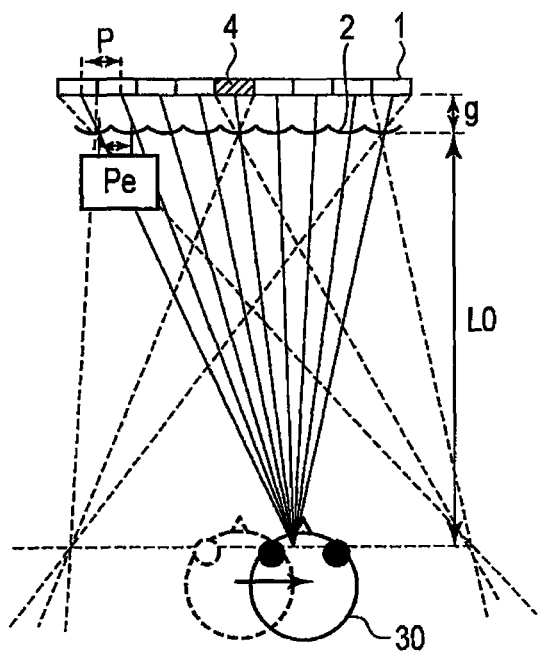
FIG. 19A is a schematic diagram showing the sub-pixel areas in the horizontal plane in the three-dimensional image display apparatus shown in FIG. 15 and in which the observer is shifted on the reference plane defined at the position of the visual distance in FIG. 16.
Figure 19B:
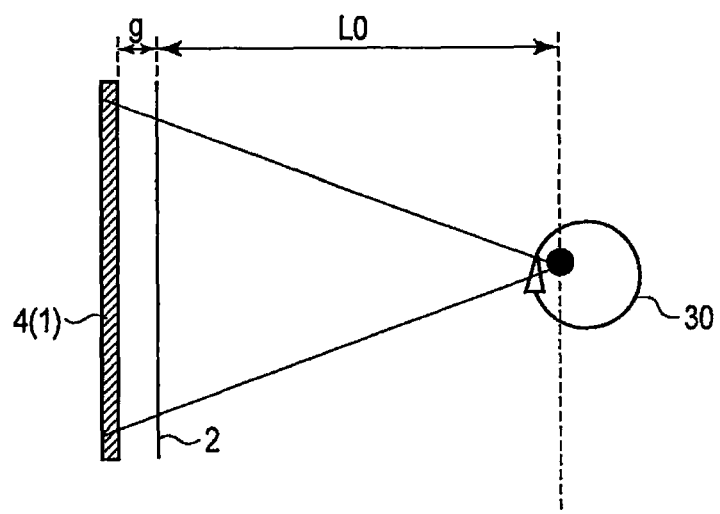
FIG. 19B is a schematic diagram showing the sub-pixel areas in the vertical plane in the three-dimensional image display apparatus shown in FIG. 15 and in which the observer is shifted on the reference plane defined at the position of the visual distance in FIG. 16.

FIG. 19C shows that the sub-pixel area 4 is shifted as shown by an arrow Shift(x) if, for example, the observer moves rightward in a horizontal cross section shown in FIG. 19A. Here, the observer is assumed not to be shifted in the vertical direction as shown in FIG. 19B. The shift Shift(x) of the sub-pixel area 4 shown in FIG. 19C is given by Expression (9).

FIGS. 20A to 20C show a shift of the sub-pixel area 4 on the display panel observed when the observer 30 is shifted as shown by an arrow in a plane containing the second direction (vertical direction). FIG. 20A shows trajectories of light rays in a plane (horizontal plane) containing the first direction. FIG. 20B shows trajectories of light rays in a plane (vertical plane) containing the second direction. When the observer 30 is shifted in the second direction as shown in FIG. 20B, the position at which the viewing space is to be maximized and thus the sub-pixel area 4 are shifted in the first direction (horizontal direction) as shown in FIG. 20C.

Figure 21A:
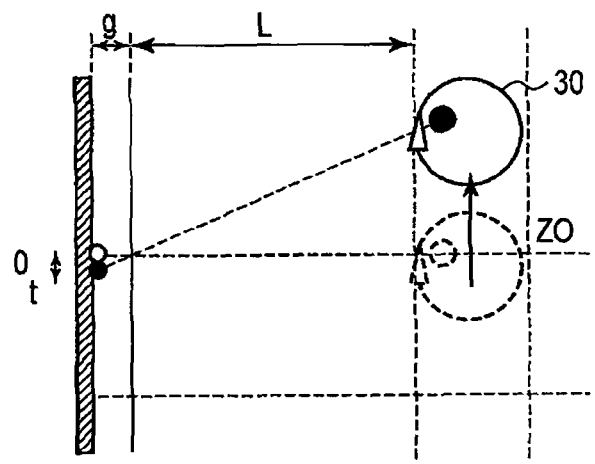
FIG. 21A is a schematic diagram showing the sub-pixel areas in the horizontal plane in the three-dimensional image display apparatus shown in FIG. 15 and in which the observer is shifted, in the vertical direction, on the reference plane defined at the position of the visual distance in FIG. 16.
Figure 21B:
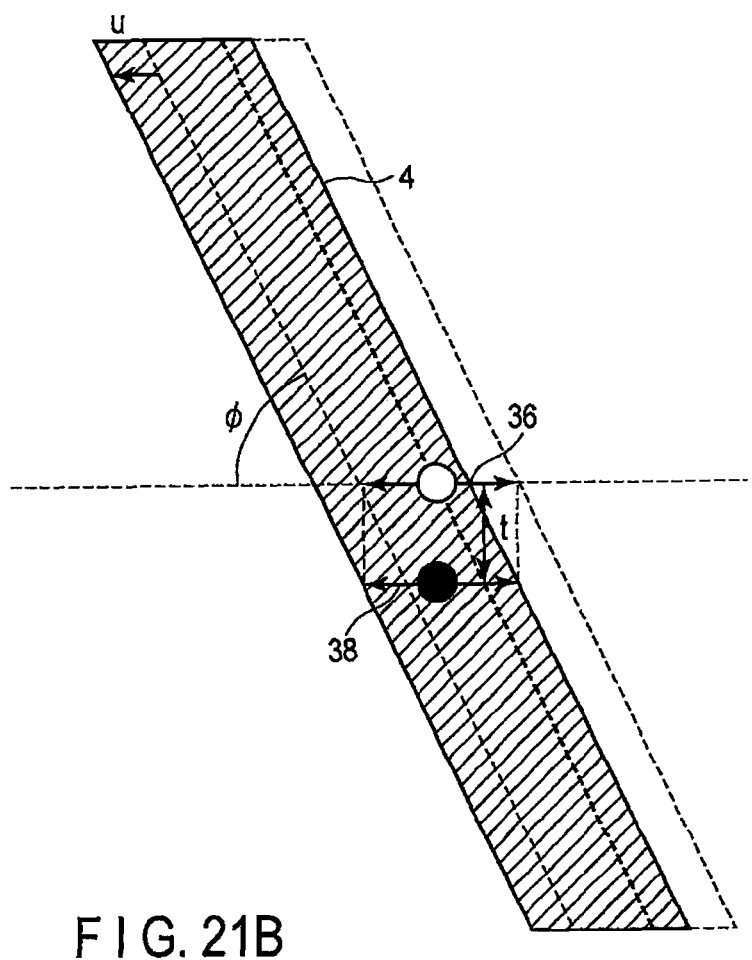
FIG. 21B is a schematic diagram showing the certain sub-pixel area on the display panel with the display area of the sub-pixel area changed when the observer is shifted as shown in FIG. 21A.

FIGS. 21A and 21B are schematic diagrams illustrating, in further detail, the change in the sub-pixel area 2 shown in FIG. 20C. FIG. 21A shows trajectories of light rays in a display vertical plane. FIG. 21B is an enlarged schematic view of the sub-pixel area 4. In FIGS. 21A and 21B, a blank circle indicates the position of a certain sub-pixel area observed on the display panel 1 when the observer 30 is positioned at a reference position shown by a dashed line in FIG. 20B and FIG. 21A. A bidirectional arrow under the blank circle indicates the range of the sub-pixel area required to maximize the viewing space around the observation position at which the blank circle is set. A filled-in circle indicate a position on the display panel 1 observed via the same optical aperture section 3 when the observer moves to a position shown by a solid line in FIG. 20B and FIG. 21A. A bidirectional arrow shown along the display panel 1 indicates the range of the sub-pixel area required to maximize the viewing space around the observation position. Here, the inclination of the lenses is denoted by $\phi$, and the visual distance is denoted by L. Then, the shift amount of the sub-pixel area 4 is determined as follows.

In the observation from the reference coordinate position shown in FIG. 21A and FIG. 21B, the shift amount u is zero. Here, if the observation position is shifted in the second direction (vertical direction) from the reference coordinate position by a distance $\Delta y$, an image corresponding to a blank circle is shifted, and the observer 30 observes the image at a position located above or below (in this case, below) the blank circle rather than immediately behind the optical aperture section 3 through which the corresponding light ray passes. Here, the initial range of the sub-pixel area 4 corresponding to the optical aperture section 3 through which the position (y coordinate=0) shown by the blank circle is observed is shown by an arrow 36 shown under the blank circle. If the image is observed at a finite distance L at a position located at a distance $\Delta y$ from the original observation position, the width of the sub-pixel area 4 to be set with respect to the above-described optical aperture section 3 with the visibility taken into account corresponds to the range of an arrow 38 shown under the filled-in circle based on the width shown by the arrow 36. When a shift in the y direction is denoted by t, the shift amount u is given as follows.

$$t:y0=g:L \qquad (11)$$

$$u=t/\tan\phi \qquad (12)$$

When the sub-pixel area 4 is shifted in the first direction in accordance with the relationship indicated by Expressions (11) and (12), the viewing space can be restrained from being narrowed when the observation position is shifted in the second direction.

Figure 22:
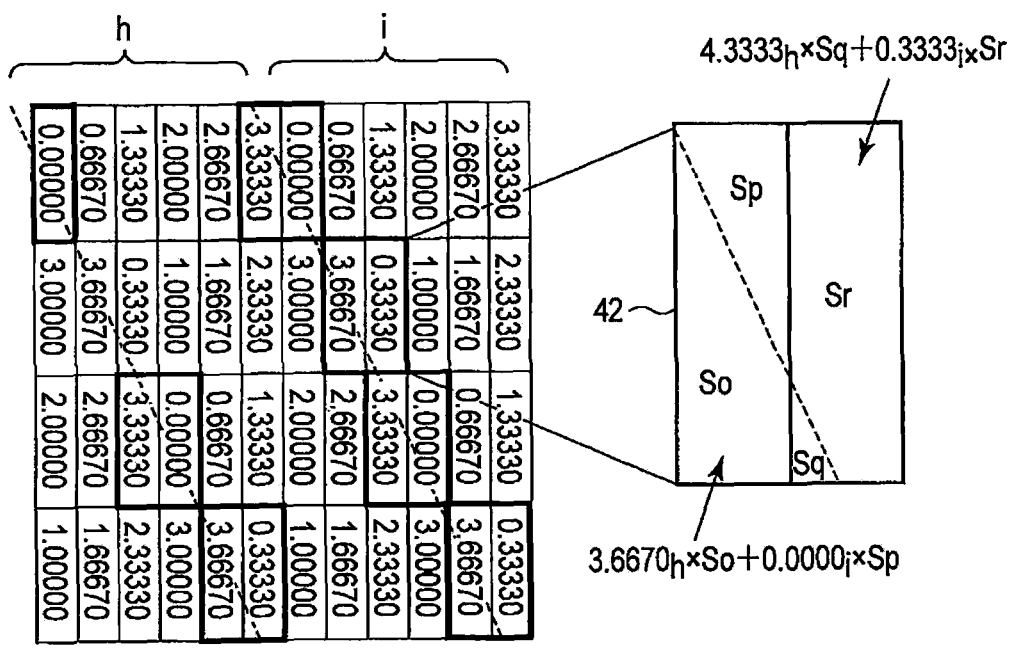
FIG. 22 is a schematic diagram showing a certain sub-pixel area on the display panel of the three-dimensional image display apparatus shown in FIG. 15 and the ratio of pieces of pixel information mixed in the sub-pixel area.

FIG. 22 shows an example of specific mapping in the sub-pixel area 4. The sub-pixels are arranged in a matrix in the horizontal and vertical directions (first and second directions) as in the case of a normal flat panel. The ratio of the length of each side of the sub-pixel area 4 in the first direction to the length of each side of the sub-pixel area 4 in the second direction is set to 1:3. When the inclination $\alpha$ of the optical apertures is atan (½), in FIG. 22, four parallaxes are assigned to pixels according to optical apertures h and i. The parallax numbers are shown as non-integers (parallax numbers 0.00000 to 3.66670) based on a position relative to the optical aperture section 3. This is because Pe=6, whereas the number of the parallaxes is four, so that the assigned parallax numbers deviate from the aperture pitch by $4/6=2/3$. Furthermore, areas enclosed by thick lines are those to which the embodiment of the present application is to be applied because the boundary between the sub-pixel areas crosses the pixels. In FIG. 22, a viewing space optimization process uniquely determines to which optical aperture section 3 specified by reference character h or i each sub-pixel and each segment area of the sub-pixel belong. FIG. 22 shows an example in which the technique according to the above-described embodiments is applied the sub-pixel areas 4. The boundary between two sub-pixels 42 and 44 fails to coincide with the boundary between the sub-pixel areas. The boundary between the sub-pixel areas crosses the sub-pixels 42 and 44 as shown by a dashed line. In this case, a mixture of two pieces of image information is displayed according to the areas into which the sub-pixels are divided by the boundary; the one of the two pieces of image information relates to parallax numbers belonging to the optical aperture section 3 dented by reference character h, and the other piece of image information relates to parallax numbers belonging to the optical aperture section 3 dented by reference character i. An alphabet added to each parallax number indicates to which optical aperture section 3 the parallax number belongs. Furthermore, reference characters So, Sp, Sq, and Sr denote areas. By way of example, the pixel formed of the segment areas denoted by reference characters So and Sp is displayed by mixing, in the ratio of the area So to the area Sp, the piece of image information related to the parallax numbers belonging to the optical aperture section 3 dented by reference character h and the piece of image information related to the parallax numbers belonging to the optical aperture section 3 dented by reference character i.

The mapping has been simply described in terms of areas. However, the visibility is preferably taken into account. Moreover, if an image processing load is disadvantageously increased by the need for more parallax information (in this case, a parallax number 4.3333 assigned to an area q), a certain effect can be produced by using the adjacent parallax number 3.6670 instead.

The example has been described. However, the present embodiment is effectively applied even if optical apertures extended in the second direction as shown in FIG. 2 are provided, with the coordinate values of the sub-pixels in the first direction deviating on a row-by-row basis as in the case of a delta sequence. That is, the embodiment is useful for all the cases where the physical boundaries between the sub-pixel areas 4 fail to coincide with the boundaries between the sub-pixels.

Figure 23:
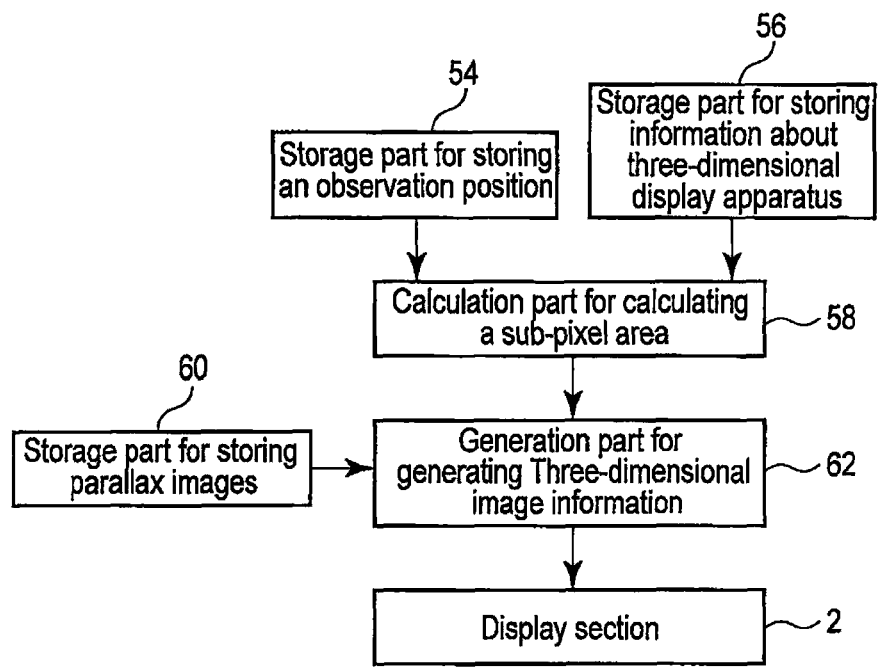
FIG. 23 is a block diagram schematically showing an image processing section of a display panel driver according to the embodiments of three-dimensional image display apparatuses shown in FIG. 1 and FIG. 15.
Figure 24:
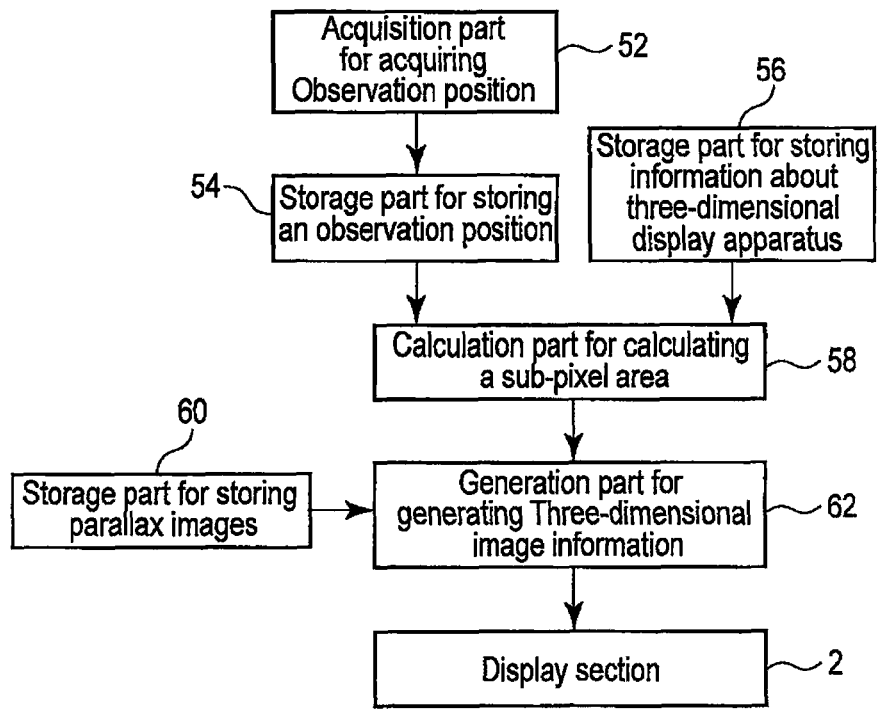
FIG. 24 is a block diagram schematically showing an image processing section of a display panel driver according to another embodiment of the three-dimensional image display apparatuses shown in FIG. 1 and FIG. 15.

A display panel driver 8 shown in FIG. 1 comprises an image processing section as shown in FIG. 23 or FIG. 24. FIG. 23 is different from FIG. 24 in that the display panel driver in FIG. 23 lacks an observation position acquisition section 52 shown in FIG. 24 and configured to acquire the observation position. Thus, the image processing section will be described with reference to FIG. 24.

The position of the observer 30 is converted into an x, y, and z coordinate signal by the observation position acquisition section 52 by processing a signal from the position sensor 5 shown in FIG. 1. The coordinate signal for the observer 30 is provided to an observation position holding section 54 configured to hold a signal for the observation position. The observation position holding section 54 shown in FIG. 23 has a plurality of positions, for example, the position of a sofa in a living room, externally registered therein via a remote controller or the like as standard positions, and also has different positions, for example, the position of a chair in a dining room, registered therein as positions where the observer views the display. Any of these positions can be selected as information for coordinate signals.

Furthermore, the image processing section comprises a three-dimensional display apparatus information holding section 56 configured to hold various parameters defining the characteristics of the three-dimensional image display apparatus, for example, the gap g, the aperture pitch Pe, and the inclination φ of the optical apertures, or similar parameter information. A sub-pixel area calculation section 58 uses Expression (1), more specifically Expression (1-1) to calculate the width P of the sub-pixel area 4 assigned to each optical aperture section 3 from the position information held in the observation position holding section 54 and the parameter information held in the three-dimensional display apparatus information holding section 56 and defining the characteristics of the three-dimensional image display apparatus. Furthermore, parameters such as the inclination and shift amount of the sub-pixel areas 4, described with reference to FIG. 12A to FIG. 14C and FIG. 16A to FIG. 22, are calculated. Parameters calculated by the sub-pixel area information calculation section 58 and related to the sub-pixel areas, such as the width P of the sub-pixel area 4, are provided to a three-dimensional image information generating part 62 configured to generate parallax image information displayed in each sub-pixel. The three-dimensional image information generating part 62 is provided with parallax image data supplied by the parallax image holding section 60, which holds parallax images. The parallax image data is converted into pixel information to be processed using the parameters and displayed as sub-pixels as shown in FIG. 22. The pixel information is supplied to the display part 2 as pixel signals. As a result, the optimum picture image (picture image) is displayed on the display panel 2 according to the position of the observer 30. Therefore, a three-dimensional picture image is observably displayed by the three-dimensional image display apparatus.

The position information may be detected by the sensor 5 and measured in real time. If the display is observed by a plurality of persons, the plurality of persons may be located in the viewing space or in a pseudo viewing space resulting from observation of image information in the sub-pixel area through the adjacent optical apertures. In either case, a viewing space is preferably provided for the plurality of persons so as to reflect the detected position information. In this case, information indicating that the display is viewed by the multiple persons is provided to the observation position holding section 54, thus allowing the width P of the sub-pixel area 4 to be determined. Furthermore, the three-dimensional image generating part 62 preferably mixes information assumed to have passed through the adjacent optical apertures 3, in the pixel Xa positioned at the boundary between the sub-pixel areas 4 in a ratio reflecting the relative relationship between the boundary between the sub-pixel areas and the center of the pixel.

As described above, in a three-dimensional image display apparatus comprising a combination of a light ray control element and a flat display device and enabling three-dimensional vides to be observed without glasses, the viewing space is maximized without a restraint on the viewpoint position by improving display images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of displaying a three-dimensional image on a display apparatus comprising:

a display part having sub-pixels arranged in a matrix along a first direction and a second direction orthogonal to the first direction; and a light ray control element comprises a plurality of optical apertures, wherein parallax image information observed via the optical apertures is displayed in sub-pixel areas to allow a three-dimensional image to be observed at an observation position, the method comprising:

defining the sub-pixel areas assigned to the optical apertures according to the observation position, specifying adjacent sub-pixel segments into which predetermined one of the sub-pixels is separated, wherein the predetermined sub-pixel corresponds to one of adjacent sub-pixels positioned at a boundary between adjacent sub-pixel areas; and displaying, on the predetermined sub-pixel, sub-pixel display information obtained by mixing parallax information belonging to the adjacent sub-pixel areas, wherein the predetermined sub-pixel is observed via the adjacent optical apertures.

2. The method according to claim 1, wherein the sub-pixel areas comprise a combination of integral numbers of sub-pixels and sub-pixel segments along the first direction, and the combination has a width equal to a width of the sub-pixel area multiplied by a non-integer.

3. The method according to claim 2, wherein the sub-pixel segments are repeated with a certain period so as to have a given width along the first direction or the first and second directions.

4. The method f according to claim 1, wherein each of the sub-pixel areas has an area width equal to a width of the sub-pixel multiplied by an integer, and a boundary between the adjacent sub-pixel areas is specified to coincide with the sub-pixel.

5. The method according to claim 1, wherein a plurality of the optical apertures are substantially linearly arranged along the third direction, each optical aperture extends along the fourth direction, and the fourth direction is non-orthogonal to the first direction and the second direction.

6. The method according to claim 1, wherein a value P obtained by normalizing a width of the sub-pixel area assigned to each of the optical apertures by means of the sub-pixel width is specified to satisfy:

$$L:(L+g)=Pe:P$$

where L denotes a distance from the observation position to the light ray control element, Pe denotes a pitch of the aperture sections normalized by the sub-pixel width, and g denotes a distance between a surface of the display part and a surface of the light ray control element.

7. The method according to claim 1, wherein an angle 2θ of a range within which a three-dimensional image is visible is given by:

$$\tan \theta = (pp \times P/2)/g = (VW/2/L)$$

where pp denotes the sub-pixel pitch and VW denotes a viewing space width at an observation distance L, and a mixture of parallax image information is displayed in the sub-pixel positioned at a boundary between the two sub-pixel areas in such a manner that the sub-pixel is observed from a direction forming an angle 2θ.

8. An image display apparatus comprising:

a display part having sub-pixels arranged in a matrix along a first direction and a second direction orthogonal to the first direction; and a light ray control element which is so arranged as to face the display part to control light rays from the display part, and which comprises a plurality of optical apertures, wherein parallax image information observed via the optical apertures is displayed in the sub-pixel areas to allow a three-dimensional image to be observed at an observation position, and a generating part configured to define the sub-pixel areas to which the optical apertures are assigned according to the observation position, respectively, and to specify adjacent sub-pixel segments into which predetermined one of the sub-pixels is separated, wherein the predetermined sub-pixel corresponds to one of adjacent sub-pixels positioned at a boundary between adjacent sub-pixel areas, sub-pixel display information is obtained by mixing parallax information belonging to the adjacent sub-pixel areas, and the generating part causing the display part to display sub-pixel display information obtained by mixing parallax information belonging to the adjacent sub-pixel areas, on the predetermined sub-pixel observed via the adjacent optical apertures.

9. The apparatus according to claim 8, wherein the sub-pixel areas comprise a combination of integral numbers of sub-pixels and sub-pixel segments along the first direction, and the combination has a width equal to a width of the sub-pixel area multiplied by a non-integer.

10. The apparatus according to claim 9, wherein the sub-pixel segments are repeated with a certain period so as to have a given width along the first direction or the first and second directions.

11. The apparatus according to claim 8, wherein each of the sub-pixel areas has an area width equal to a width of the sub-pixel multiplied by an integer, and a boundary between the adjacent sub-pixel areas is specified to coincide with the sub-pixel.

12. The apparatus according to claim 8, wherein a plurality of the optical apertures substantially linearly arranged along the third direction, each optical aperture extending along the fourth direction, the fourth direction being non-orthogonal to the first direction and the second direction.

13. The apparatus according to claim 8, wherein a value obtained by normalizing a width of the sub-pixel area assigned to each of the optical apertures by means of the sub-pixel width is specified to satisfy:

$$L:(L+g)=Pe:P$$

where L denotes a distance from the observation position to the light ray control element, Pe denotes a pitch of the aperture sections normalized by the sub-pixel width, and g denotes a distance between a surface of the display part and a surface of the light ray control element.

14. The apparatus according to claim 8, wherein an angle $2\theta$ of a range within which a three-dimensional image is visible is given by:

$$\tan\theta=(pp\times P/2)/g=(VW/2/L)$$

where pp denotes the sub-pixel pitch and VW denotes a viewing space width at an observation distance L, and a mixture of parallax image information is displayed in the sub-pixel positioned at a boundary between the two sub-pixel areas in such a manner that the sub-pixel is observed from a direction forming an angle $2\theta$.

* * * * *